(12) United States Patent
Coxon et al.

(10) Patent No.: US 9,914,268 B2
(45) Date of Patent: Mar. 13, 2018

(54) SYSTEMS AND METHODS FOR DEFINING A SURFACE CONTOUR OF A LAYERED CHARGE OF MATERIAL

(71) Applicant: The Boeing Company, Huntington Beach, CA (US)

(72) Inventors: Brad Andrew Coxon, Everett, WA (US); Kurtis Shuldberg Willden, Kent, WA (US); Kieran P. Davis, Seattle, WA (US)

(73) Assignee: The Boeing Company, Chicago, IL (US)

( * ) Notice: Subject to any disclaimer, the term of this patent is extended or adjusted under 35 U.S.C. 154(b) by 914 days.

(21) Appl. No.: 14/295,884

(22) Filed: Jun. 4, 2014

(65) Prior Publication Data

US 2015/0352795 A1     Dec. 10, 2015

(51) Int. Cl.
*B29C 70/34*     (2006.01)
*B29C 70/78*     (2006.01)
(Continued)

(52) U.S. Cl.
CPC ............ *B29C 70/342* (2013.01); *B29C 70/78* (2013.01); *B29C 33/48* (2013.01);
(Continued)

(58) Field of Classification Search
CPC .................. B29C 70/342; B29C 70/78; B29C 2043/3649; B29C 33/48; B29C 59/02;
(Continued)

(56) References Cited

U.S. PATENT DOCUMENTS 3,614,811 A    10/1971  Johnson
4,568,588 A     2/1986  Fujiki et al.
(Continued)

FOREIGN PATENT DOCUMENTS

GB          2 486 231           6/2012
WO    WO 2012076875 A1 *  6/2012  ............ B29C 53/04
WO    WO 2012148472 A2 * 11/2012  ............ B25J 9/1075

OTHER PUBLICATIONS

European Patent Office, Extended European Search Report for related European Patent Application No. 15 16 8864, dated Nov. 17, 2015.
U.S. Appl. No. 13/752,139, filed Jan. 28, 2013, Rotter et al.

*Primary Examiner* — Alison L Hindenlang
*Assistant Examiner* — Yunju Kim
(74) *Attorney, Agent, or Firm* — DASCENZO Intellectual Property Law, P.C.

(57) ABSTRACT

Systems and methods for defining a surface contour of a layered charge of material are disclosed herein. The systems include a forming die, which includes a forming surface shaped to define a desired surface contour of the layered charge, and a fluidly actuated support, which includes a support surface that is adjacent to the forming surface and located to support the layered charge. The systems further include a vacuum bag that at least partially defines an enclosed volume and a vacuum source configured to selectively apply a vacuum to the enclosed volume. The methods include locating the layered charge on the forming surface and on the support surface, covering the layered charge with the vacuum bag to define the enclosed volume, applying the vacuum to the enclosed volume, compressing the fluidly actuated support, translating the support surface, and deforming the layered charge to define the desired surface contour.

28 Claims, 10 Drawing Sheets

(51) Int. Cl.
*B29C 43/36* (2006.01)
*B29C 33/48* (2006.01)
*B29K 105/08* (2006.01)

(52) U.S. Cl.
CPC ............... *B29C 2043/3649* (2013.01); *B29K 2105/0872* (2013.01); *Y02T 50/433* (2013.01)

(58) Field of Classification Search
CPC ............. B29C 66/81457; B29C 45/76; B29K 2105/0872; B32B 37/02; Y02T 50/433; F15B 15/10; B28B 17/00
USPC ...... 264/266, 320, 40.5; 415/182.1; 156/222
See application file for complete search history.

(56) References Cited

U.S. PATENT DOCUMENTS

| | | |
|---|---|---|
| 5,092,954 A | 3/1992 | Braun et al. |
| 5,348,602 A | 9/1994 | Makarenko et al. |
| 5,427,518 A | 6/1995 | Morizot et al. |
| 6,814,916 B2 | 11/2004 | Willden et al. |
| 8,142,181 B2 | 3/2012 | Willden et al. |
| 8,236,222 B2 | 8/2012 | Henderson et al. |
| 9,144,959 B1 | 9/2015 | Rotter et al. |
| 2008/0105128 A1 | 5/2008 | Yang |
| 2009/0091052 A1* | 4/2009 | Pridie ................ B29C 43/3642 264/40.5 |
| 2009/0091063 A1* | 4/2009 | Petersson ................ B29C 43/12 264/320 |
| 2012/0153531 A1 | 6/2012 | Rober et al. |
| 2013/0266432 A1* | 10/2013 | Iwakiri ................ F04D 29/441 415/204 |

\* cited by examiner

SYSTEMS AND METHODS FOR DEFINING A SURFACE CONTOUR OF A LAYERED CHARGE OF MATERIAL

FIELD

The present disclosure relates generally to systems and methods for defining a surface contour of a layered charge of material and more specifically to systems and methods that utilize a forming die, a fluidly actuated support, and a vacuum bag to define the surface contour of the layered charge of material.

BACKGROUND

Historically, construction of composite structures that define non-planar surface contours has been a serial process in which a plurality of plies of composite material is located layer-by-layer on a layup mandrel. While such a process may be effective, it may be inefficient and/or costly to implement, especially with larger and/or more complex composite structures. As composite structures become more complex, such as may be the case for airplanes and/or portions thereof, a time required to complete such a layer-by-layer assembly may become significant.

More recently, drape-forming processes have been developed that permit layered charges of composite material to be formed and/or laid up on a flat, or at least substantially flat, surface and subsequently deformed to a final, or desired, shape. However, deformation of the layered charge may induce undesired buckles and/or wrinkles within the layered charge, and these buckles and/or wrinkles may preclude the use of a conventional drape forming process in certain applications, such as aircraft construction. Thus, there exists a need for improved systems and methods for defining a surface contour of a layered charge of material.

SUMMARY

Systems and methods for defining a surface contour of a layered charge of material are disclosed herein. The systems include a forming system for deforming the layered charge of material from an initial conformation to a final conformation that defines the desired surface contour. The forming system include a forming die, which includes a forming surface shaped to at least partially define the desired surface, and a fluidly actuated support, which includes a support surface that is adjacent to the forming surface and located to at least temporarily support the layered charge. The forming system further includes a vacuum bag that at least partially defines an enclosed volume and a vacuum source configured to selectively apply a vacuum to the enclosed volume.

In some embodiments, the forming surface includes an initial contact region that is configured to contact the layered charge when the layered charge is in the initial conformation. In some embodiments, the forming surface includes a subsequent contact region that is configured to contact the layered charge when the layered charge is in the final conformation. In some embodiments, the support surface is adjacent to the initial contact region when the layered charge is in the initial conformation.

In some embodiments, the fluidly actuated support is configured to transition among a plurality of conformations between an extended conformation and a retracted conformation. In some embodiments, the layered charge is supported by the support surface and by the initial contact region when the fluidly actuated support is in the extended conformation. In some embodiments, the layered charge is supported by the initial contact region and by the subsequent contact region when the fluidly actuated support is in the retracted conformation. In some embodiments, the fluidly actuated support is configured to transition between the extended conformation and the retracted conformation responsive to a pressure within the enclosed volume.

In some embodiments, the fluidly actuated support includes a foam body. In some embodiments, the fluidly actuated support further includes a covering that defines a covered volume that includes the foam body. In some embodiments, the vacuum source is a first vacuum source, the vacuum is a first vacuum, and the system further includes a second vacuum source that is configured to apply a second vacuum to the covered volume. In some embodiments, the second vacuum source is configured to selectively apply the second vacuum independent from application of the first vacuum by the first vacuum source.

In some embodiments, the fluidly actuated support includes a flange plate that defines the support surface. In some embodiments, the system further includes a heating assembly that is configured to heat the layered charge.

In some embodiments, the layered charge is located within the enclosed volume and is in contact with the forming die and with the fluidly actuated support. In some embodiments, the fluidly actuated support is in an intermediate conformation that is between the extended conformation and the retracted conformation, and the layered charge defines a first bend that is proximal to an edge of the forming die and a second bend that is proximal to an interface region between the forming die and the fluidly actuated support.

The methods include locating the layered charge on the forming surface and on the support surface and covering the layered charge with the vacuum bag to define the enclosed volume. The methods further include applying the vacuum to the enclosed volume, compressing the fluidly actuated support, translating the support surface, and deforming the layered charge to define the desired surface contour.

In some embodiments, the compressing is initiated independently from the applying. In some embodiments, the compressing is responsive to the applying. In some embodiments, the fluidly actuated support includes a covering that defines a covered volume, the vacuum is a first vacuum, and the compressing includes applying a second vacuum to the covered volume. In some embodiments, the applying the second vacuum is independent from the applying the first vacuum.

In some embodiments, the methods further include regulating a rate of compression of the fluidly actuated support by regulating a rate of application of a vacuum to regulate a radius of curvature that is experienced by the layered charge during the deforming. This may include increasing the rate of application of the vacuum to increase the radius of curvature and/or decreasing the rate of application of the vacuum to decrease the radius of curvature.

In some embodiments, the translating includes increasing a fraction of the layered charge that is supported by the forming surface and/or decreasing a fraction of the layered charge that is supported by the support surface. In some embodiments, the deforming includes establishing a first bend in the layered charge that is proximal to an edge of the forming die and also establishing a second bend in the layered charge that is proximal to an interface between the forming die and the fluidly actuated support.

In some embodiments, the method further includes locating a wrinkle diffuser in contact with the layered charge and/or inducing undulations within the layered charge with the wrinkle diffuser. In some embodiments, the methods further include locating a stretch film between the vacuum bag and the layered charge and/or maintaining at least a portion of the layered charge in tension with the vacuum bag.

DESCRIPTION

Figure 1:
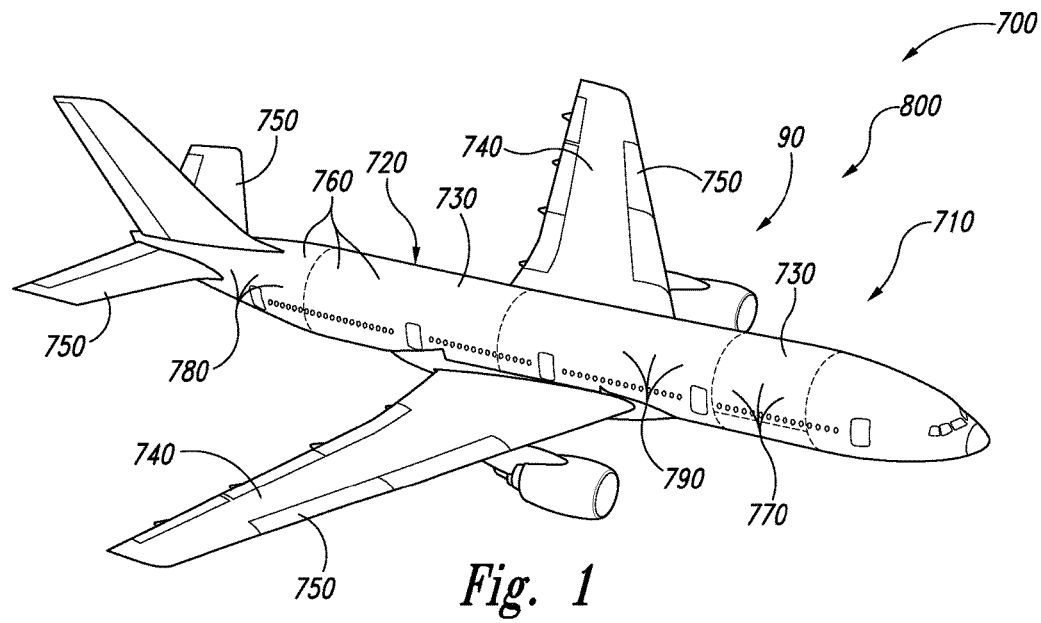
FIG. 1 is an illustrative, non-exclusive example of an aircraft that includes a composite structure that may be formed using the systems and methods according to the present disclosure.

FIGS. 1-17 provide illustrative, non-exclusive examples of layered charges 90, of composite structures 800 that include layered charges 90, of forming systems 20 for deforming layered charges 90 to define a desired surface contour in layered charge 90, of components of forming systems 20, of methods of operating forming systems 20, and/or of methods of defining the desired surface contour according to the present disclosure. Elements that serve a similar, or at least substantially similar, purpose are labeled with like numbers in each of FIGS. 1-17, and these elements may not be discussed in detail herein with reference to each of FIGS. 1-17. Similarly, all elements may not be labeled in each of FIGS. 1-17, but reference numerals associated therewith may be utilized herein for consistency. Elements, components, and/or features that are discussed herein with reference to one or more of FIGS. 1-17 may be included in and/or utilized with any of FIGS. 1-17 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
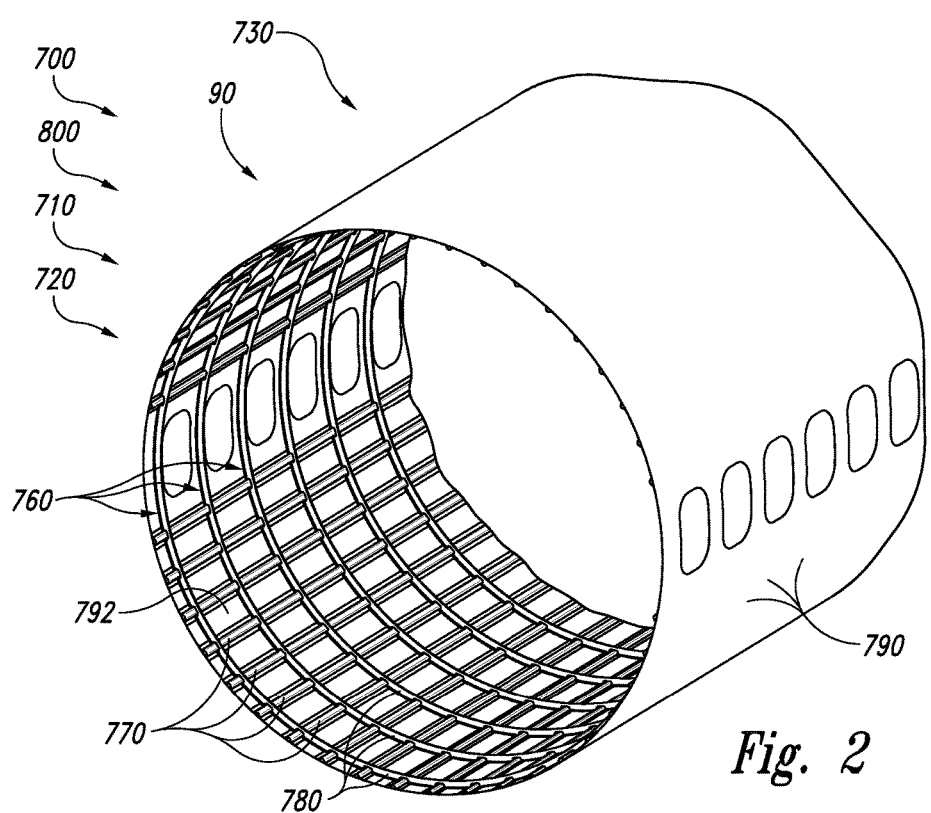
FIG. 2 is an illustrative, non-exclusive example of a fuselage barrel that may form a portion of the aircraft of FIG. 1.

FIG. 1 is an illustrative, non-exclusive example of an aircraft 700 that includes a composite structure 800 that may be constructed utilizing layered charges 90. Layered charge 90 may be formed using the systems and methods according to the present disclosure. FIG. 2 is an illustrative, non-exclusive example of a fuselage barrel 730 that may form a portion of aircraft 700 and includes composite structure 800 that may be constructed utilizing layered charges 90. Aircraft 700 and/or composite structure 800 thereof may include a plurality of skin segments 790 that may form, cover, and/or be an outer surface of any suitable portion of aircraft 700, and skin segments 790 may include, be formed from, and/or be constructed utilizing layered charges 90. As illustrated most clearly in FIG. 2, aircraft 700 also may include a plurality of stringers 770 that, together with a plurality of frames 780, may support an inner surface 792 of skin segments 790. A plurality of fillers 760 may extend between frames 780 and inner surface 792 and may form a portion of composite structure 800. Similar to skin segments 790, stringers 770, frames 780, and/or fillers 760 may include, be formed from, and/or be constructed utilizing layered charges 90.

It is within the scope of the present disclosure that any suitable portion of aircraft 700 may be formed from and/or be composite structure 800. As illustrative, non-exclusive examples, composite structure 800 may form, or form a portion of, an airframe 710, a fuselage 720, a fuselage barrel 730, a wing 740, and/or a stabilizer 750 of aircraft 700.

Figure 3:
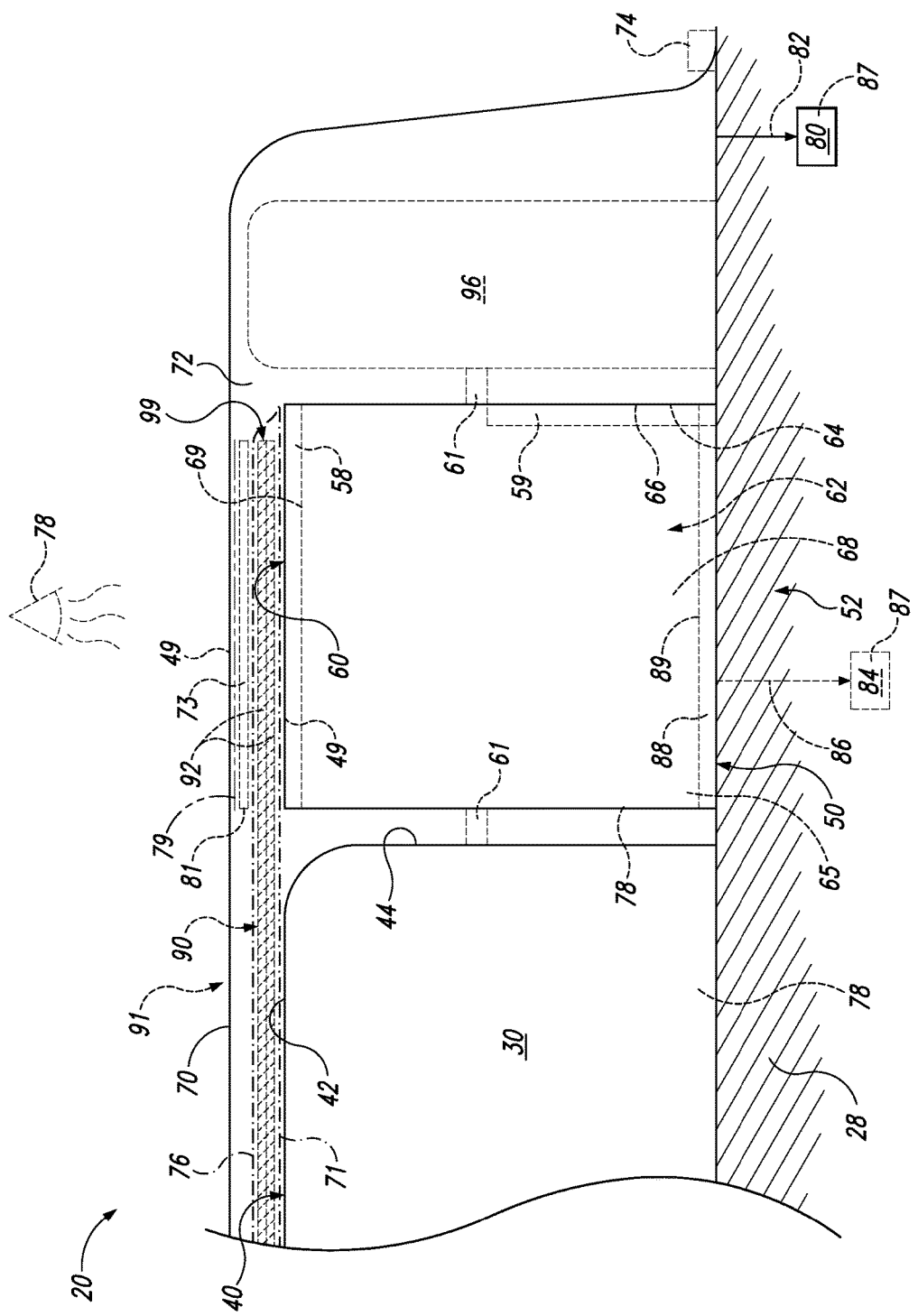
FIG. 3 is a schematic representation of illustrative, non-exclusive examples of a forming system according to the present disclosure illustrating a fluidly actuated support in an extended conformation.
Figure 4:
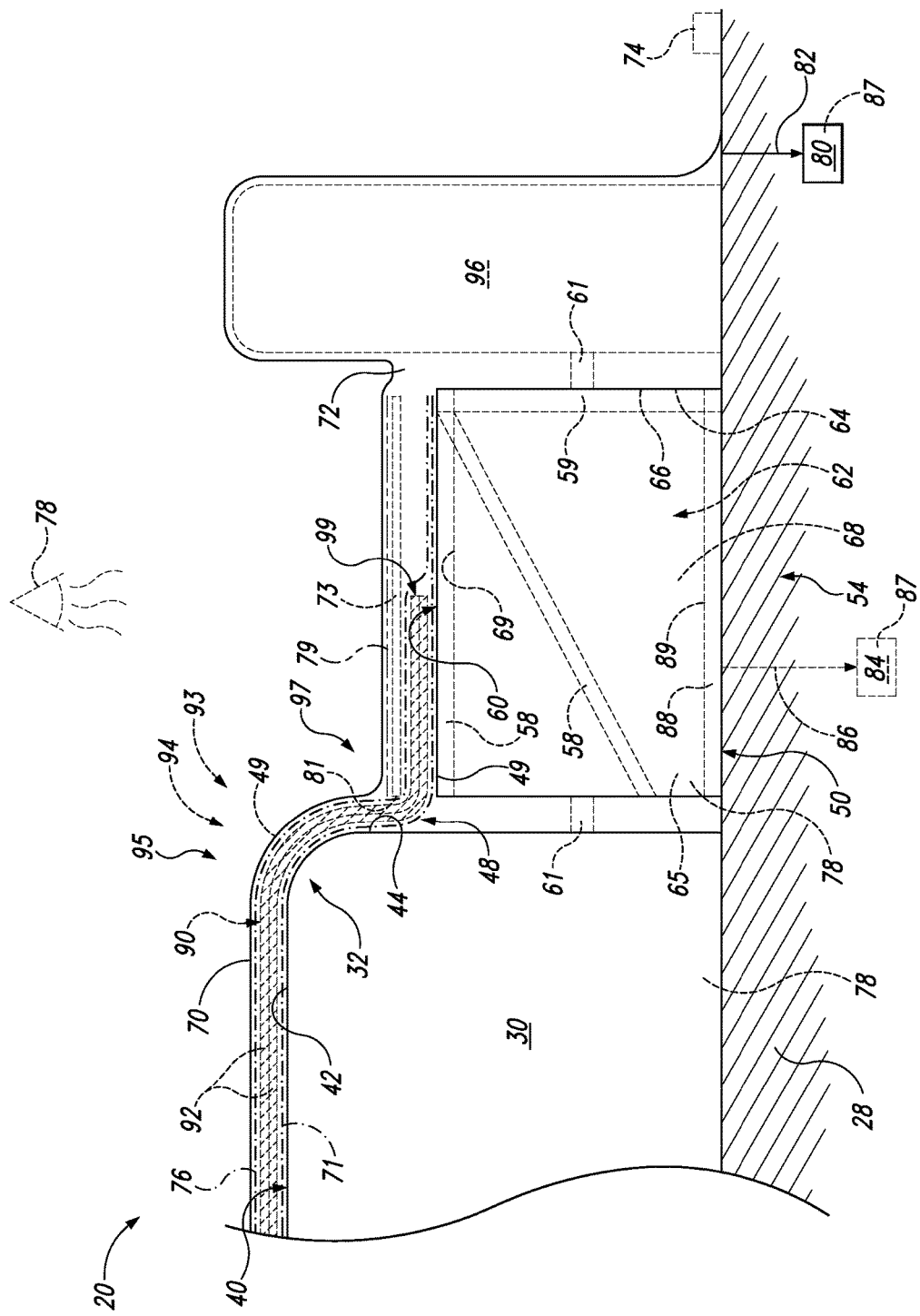
FIG. 4 is a schematic representation of illustrative, non-exclusive examples of the forming system of FIG. 3 illustrating the fluidly actuated support in an intermediate conformation.
Figure 5:
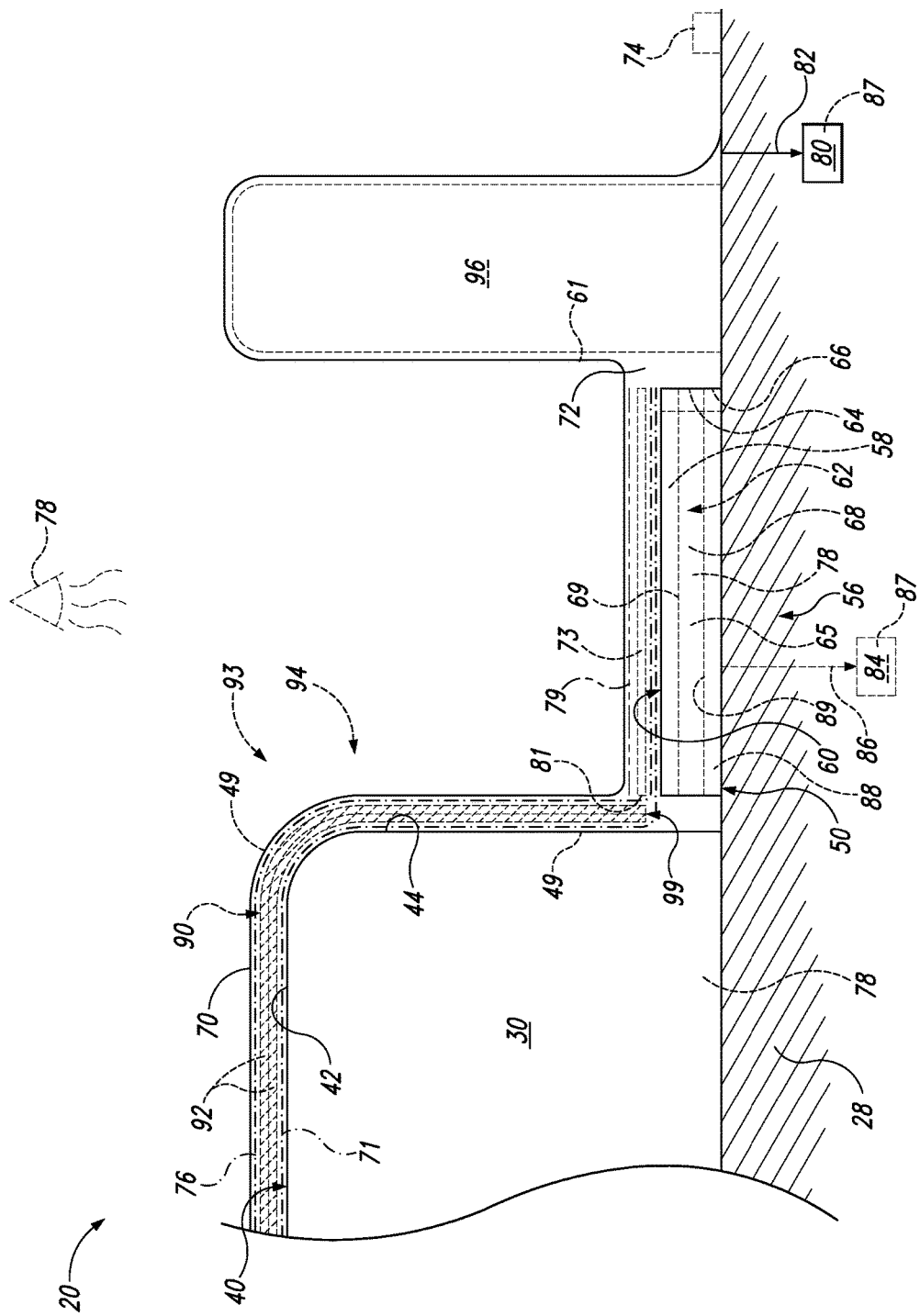
FIG. 5 is a schematic representation of illustrative, non-exclusive examples of the forming system of FIGS. 3-4 illustrating the fluidly actuated support in a retracted conformation.

FIGS. 3-5 are schematic representations of illustrative, non-exclusive examples of forming systems 20 according to the present disclosure. Forming systems 20 also may be referred to herein as systems 20 and may be adapted, designed, configured, and/or constructed to deform a layered charge of material 90 to define a desired surface contour thereof. Layered charge of material 90 also may be referred to herein as a layered charge 90. As illustrated in solid lines in FIGS. 3-5, forming systems 20 include a forming die 30, a fluidly actuated support 50, a vacuum bag 70, and a vacuum source 80.

FIGS. 3-5 illustrate system 20 as including a single fluidly actuated support that extends along an edge 32 of forming die 30. However, it is within the scope of the present disclosure that system 20 may include any suitable number of fluidly actuated supports 50 and/or that one or more fluidly actuated supports 50 may extend around any suitable portion of forming die 30.

As an illustrative, non-exclusive example, FIGS. 3-5 may illustrate half of system 20 and fluidly actuated support 50 may be a first fluidly actuated support 50 that extends along a (left) side of forming die 30. In addition, system 20 may include a second fluidly actuated support 50 that extends along another (right or opposed) side of forming die 30. Under these conditions, system 20 may be utilized to form layered charge 90 into a U-shaped, or "C," channel. As another illustrative, non-exclusive example, fluidly actuated support 50 may surround most, or even all, of an outer perimeter, or edge 32, of forming die 30.

As illustrated in FIG. 3, fluidly actuated support 50 initially may be in an extended conformation 52, and a support surface 60 of fluidly actuated support 50 may be adjacent to a forming surface 40 of forming die 30. As such, an initial contact region 42 of forming surface 40 may have and/or define an edge profile, and fluidly actuated support 50 may be shaped to correspond to the edge profile. In addition, layered charge 90 may be located on and/or supported by both support surface 60 and forming surface 40, and vacuum bag 70 may extend across and/or cover support surface 60, forming surface 40, and/or layered charge 90. Thus, vacuum bag 70 may at least partially define an enclosed volume 72 that includes and/or contains forming surface 40, support surface 60, and/or layered charge 90. In FIG. 3, layered charge 90 may be in and/or may define an initial conformation 91.

Then, a vacuum 82 may be selectively applied to enclosed volume 72 by vacuum source 80. Application of vacuum 82 may compress vacuum bag 70 against layered charge 90, thereby compressing and/or compacting layered charge 90 against forming die 30 and/or fluidly actuated support 50.

Forming die 30 and/or forming surface 40 thereof may include an initial contact region 42 and a subsequent contact region 44. As illustrated in FIG. 4, fluidly actuated support 50 may transition to an intermediate conformation 54 via translation of support surface 60 in a vertical direction and/or away from initial contact region 42. Transitioning fluidly actuated support 50 to intermediate conformation 54 may bring at least a portion of layered charge 90 into contact with subsequent contact region 44 and/or may increase a portion, proportion, or fraction of layered charge 90 that is in contact with and/or supported by forming die 30. Additionally or alternatively, transitioning fluidly actuated support 50 to intermediate conformation 54 may cause layered charge 90 to slide across support surface 60 and/or to slide toward forming die 30.

When fluidly actuated support 50 is in intermediate conformation 54, layered charge 90 may define a first bend 95 and a second bend 97. First bend 95 may be proximal to edge 32 of forming die 30, and second bend 97 may be proximal to an interface region 48 between fluidly actuated support 50 and forming die 30. A curvature of first bend 95 may be at least substantially opposed to a curvature of second bend 97, which may decrease a distance over which a plurality of layers 92 that comprise layered charge 90 may be in tension and/or compression due to deformation of layered charge 90. First bend 95 and second bend 97 together may be referred to herein as a Z-bend.

First bend 95 and/or second bend 97 may have and/or define any suitable radius of curvature, illustrative, non-exclusive examples of which are disclosed herein. In addition, and as discussed in more detail herein, forming system 20 may be adapted, configured, designed, and/or constructed to selectively control and/or regulate the radius of curvature of first bend 95 and/or of second bend 97.

FIG. 4 may illustrate a final conformation 93 for layered charge 90 that defines a desired surface contour 94 of layered charge 90. Alternatively, it is within the scope of the present disclosure that fluidly actuated support 50 further may transition to a retracted conformation 56, as illustrated in FIG. 5, and that layered charge 90 may be in final conformation 93 when fluidly actuated support 50 is in retracted conformation 56. When fluidly actuated support 50 is in retracted conformation 56, layered charge 90 may no longer be in contact with support surface 60 and/or may be fully supported by and/or in contact with forming surface 40, initial contact region 42, and/or subsequent contact region 44.

Regardless of an exact shape of layered charge 90 that defines desired surface contour 94, desired surface contour 94 may be a non-planar surface contour (as illustrated in FIGS. 4-5). As an illustrative, non-exclusive example, desired surface contour 94 may include and/or define at least one bend in at least one dimension and/or direction. As another illustrative, non-exclusive example, desired surface contour 94 may include and/or define a complex surface contour that varies and/or defines bends in at least two dimensions and/or directions.

Generally, fluidly actuated support 50 transitions among extended conformation 52 of FIG. 3, intermediate conformation 54 of FIG. 4, and/or retracted conformation 56 of FIG. 5 responsive to a fluid flow and/or responsive to a pressure differential. As an illustrative, non-exclusive example, a pressure differential that is generated by evacuation of enclosed volume 72 may (at least partially) cause fluidly actuated support 50 to transition among extended conformation 52, intermediate conformation 54, and/or retracted conformation 56. As a more specific but still illustrative, non-exclusive example, fluidly actuated support 50 may include and/or be a foam body 62.

Under these conditions, partial evacuation of enclosed volume 72 (or the pressure differential that is generated by partial evacuation of enclosed volume 72) may generate an atmospheric pressure force on vacuum bag 70 that may compress fluidly actuated support 50 from extended conformation 52 to intermediate conformation 54. Further evacuation of enclosed volume 72 may increase the atmospheric pressure force on vacuum bag 70, further compressing fluidly actuated support 50 to retracted conformation 56.

Additionally or alternatively, fluidly actuated support 50 may be configured to transition among extended conformation 52, intermediate conformation 54, and/or retracted conformation 56 independently from a pressure within enclosed volume 72 and/or independently from the atmospheric pressure force. As an illustrative, non-exclusive example, foam body 62 may be covered by a covering 64 and/or fluidly actuated support 50 may include a bellows 66 that is biased to extended conformation 52 by a spring 68.

Under these conditions, vacuum source 80 may be a first vacuum source 80 that may be configured to apply and/or generate a first vacuum 82, and system 20 further may include a second vacuum source 84 that is configured to apply and/or generate a second vacuum 86. The application of second vacuum 86 by second vacuum source 84 may be utilized to selectively transition fluidly actuated support 50 among extended conformation 52, intermediate conformation 54, and retracted conformation 56. In addition, this selective transitioning of fluidly actuated support 50 may be performed independent from the pressure within enclosed volume 72 and/or independent from the application of first vacuum 82 by first vacuum source 80. With this in mind, second vacuum source 84 also may be configured to provide fluid to and/or to pressurize fluidly actuated support 50 in addition to (or instead of) applying second vacuum 86 to fluidly actuated support 50.

As an illustrative, non-exclusive example, and with reference to FIG. 3, first vacuum 82 may be applied by first vacuum source 80 but second vacuum 86 may not be applied by second vacuum source 84. Under these conditions, enclosed volume 72 may be at least partially evacuated by first vacuum source 80, causing vacuum bag 70 to press against layered charge 90 and/or producing compaction of layered charge 90. However, support surface 60 may be at least substantially immobile relative to forming surface 40.

Subsequently, and as illustrated in FIG. 4, second vacuum 86 may be applied by second vacuum source 84. This may cause fluidly actuated support 50 to transition from extended conformation 52 (as illustrated in FIG. 3) to intermediate conformation 54, producing deformation of layered charge 90. Further application of second vacuum 86 may cause fluidly actuated support 50 to transition (from extended conformation 52 and/or from intermediate conformation 54) to retracted conformation 56 (as illustrated in FIG. 5). As discussed in more detail herein, this independent control of the compaction of layered charge 90 (via application of first vacuum 82) and transitioning of fluidly actuated support 50 (via application of second vacuum 86) may be utilized to control a shape of layered charge 90 during deformation thereof and/or to control a rate at which layered charge 90 is deformed by system 20.

Forming die 30 may include any suitable structure that may be shaped to at least partially define desired surface contour 94 in layered charge 90. As an illustrative, non-exclusive example, a forming surface contour of forming surface 40 may correspond to and/or be a mirror image of desired surface contour 94. Forming die 30 also may be referred to herein as, and/or may be, a layup mandrel 30.

As discussed, forming surface 40 may include initial contact region 42 and subsequent contact region 44. Initial contact region 42 may be located, shaped, and/or configured to contact (directly or indirectly) layered charge 90 prior to deformation of layered charge 90, while layered charge 90 is in initial conformation 91, and/or while fluidly actuated support 50 is in extended conformation 52. In addition, subsequent contact region 44 may be located, shaped, and/or configured to contact (directly or indirectly) layered charge 90 subsequent to deformation of layered charge 90, while layered charge 90 is in final conformation 93, and/or while fluidly actuated support 50 is in intermediate conformation 54 and/or in retracted conformation 56.

Initial contact region 42 may have and/or define any suitable shape. As an illustrative, non-exclusive example, initial contact region 42 may be planar, or at least substantially planar. As another illustrative, non-exclusive example, initial contact region 42 may be adjacent to and/or at least substantially coplanar with support surface 60 while fluidly actuated support 50 is in extended conformation 52 and/or while layered charge 90 is in initial conformation 91. As yet another illustrative, non-exclusive example, initial contact region 42 may define a gradual and/or sloped transition to support surface 60. As yet another illustrative, non-exclusive example, initial contact region 42 may be non-planar.

Fluidly actuated support 50 may include any suitable structure that may define support surface 60, that may be located to at least temporarily support at least a portion of layered charge 90, and/or that may transition among extended conformation 52, intermediate conformation 54, and retracted conformation 56 responsive to a pressure differential and/or responsive to a fluid flow within forming system 20.

As an illustrative, non-exclusive example, and as discussed, fluidly actuated support 50 may include and/or be foam body 62. When fluidly actuated support 50 includes foam body 62, foam body 62 may be expanded when fluidly actuated support 50 is in expanded conformation 52. Conversely, foam body 62 may be compressed when fluidly actuated support 50 is in retracted conformation 56. As discussed in more detail herein, foam body 62 may have and/or define a constant material property, such as a constant elasticity, Young's modulus, density, percent solid volume, viscosity, indentation force deflection, spring constant, and/or Poisson's ratio. Additionally or alternatively, foam body 62 also may have and/or define a material property, such as an elasticity, a Young's modulus, a density, a percent solid volume, a viscosity, an indentation force deflection, a spring constant, and/or a Poisson's ratio that varies systematically with location within the foam body.

As discussed, when fluidly actuated support 50 is in extended conformation 52, layered charge 90 may be supported by, may be in contact with, may be in physical contact with, may be in indirect physical contact with, and/or may be in direct physical contact with support surface 60 and with initial contact region 42 of forming surface 40. In addition, and when fluidly actuated support 50 is in retracted conformation 56, layered charge 90 may be supported by, may be in contact with, may be in physical contact with, may be in indirect physical contact with, and/or may be in direct physical contact with initial contact region 42 and with subsequent contact region 44.

As also discussed, fluidly actuated support 50 further may include covering 64. Covering 64 may define a covered volume 65 that contains and/or includes foam body 62. Additionally or alternatively, covering 64 also may fluidly isolate foam body 62 from (a remainder of) enclosed volume 72. When fluidly actuated support 50 includes covering 64, second vacuum source 84 may be configured to selectively apply second vacuum 86 to covered volume 65. Covering 64 may be formed from any suitable material. As illustrative, non-exclusive examples, covering 64 may include and/or be a film, a polymeric film, an elastomeric film, a stretchable film, a flexible film, a sheet, a polymeric sheet, an elastomeric sheet, a stretchable sheet, and/or a flexible sheet.

As further discussed, fluidly actuated support 50 also may include bellows 66. Bellows 66 also may be referred to herein as accordion 66 or as accordion bellows 66 and may define covered volume 65. As also discussed, spring 68 may be located within bellows 66 and may be configured to bias bellows 66 to and/or toward extended conformation 52.

When fluidly actuated support 50 includes covering 64 and/or bellows 66 (i.e., when fluidly actuated support 50 defines covered volume 65), system 20 and/or fluidly actuated support 50 thereof further may include a vacuum manifold 88. Vacuum manifold 88 may be in fluid communication with covered volume 65 and/or with second vacuum source 84 and may be configured to convey second vacuum 86 between second vacuum source 84 and covered volume 65.

Vacuum manifold 88 may include a plurality of vacuum holes 89 that may provide fluid communication between covered volume 65 and second vacuum source 84. The plurality of vacuum holes 89 may have and/or define any suitable relative orientation and/or spatial distribution. As an illustrative, non-exclusive example, a spatial distribution of the plurality of vacuum holes 89 may be selected to provide (at least substantially) uniform compression of fluidly actuated support 50 upon application of second vacuum 86. As another illustrative, non-exclusive example, the spatial distribution of the plurality of vacuum holes may be selected to provide non-uniform compression of fluidly actuated support 50 upon application of second vacuum 86.

Vacuum bag 70 may include any suitable structure that may cover and/or extend across layered charge 90, may cover and/or extend across support surface 60, may cover and/or extend across forming surface 40, and/or may at least partially define enclosed volume 72. As illustrative, non-exclusive examples, vacuum bag 70 may include and/or be a film, a polymeric film, an elastomeric film, a stretchable film, a flexible film, a sheet, a polymeric sheet, an elastomeric sheet, a stretchable sheet, and/or a flexible sheet.

As illustrated in FIGS. 3-5, vacuum bag 70 may be configured to conform to a shape of forming die 30 and/or of fluidly actuated support 50 during deformation of layered charge 90. As also illustrated, system 20 may include a sealing structure 74 that may be configured to form a fluid seal between vacuum bag 70 and a base structure 28 that may support and/or form a portion of forming die 30 and/or fluidly actuated support 50. Illustrative, non-exclusive examples of sealing structure 74 include an adhesive and/or an adhesive tape.

(First) vacuum source 80 and/or second vacuum source 84 may be referred to herein as vacuum sources 80/84 and may include and/or be any suitable structure that may be adapted and/or configured to generate and/or apply (first) vacuum 82 and/or second vacuum 86, respectively. As illustrative, non-exclusive examples, vacuum sources 80/84 may include and/or be a vacuum pump and/or a blower. It is within the scope of the present disclosure that vacuum sources 80/84 may be separate and/or distinct vacuum sources. Alternatively, it is also within the scope of the present disclosure that vacuum sources 80/84 may be a single (or the same) vacuum source. Regardless of the exact configuration, one or more valves 87 may be utilized to selectively apply (first) vacuum 82 and/or second vacuum 86 to enclosed volume 72 and/or to covered volume 65, respectively.

Layered charge 90 may include any suitable structure that includes a plurality of layers 92 of material, that may be located within enclosed volume 72, that may be located in contact, in direct contact, in indirect contact, and/or in physical contact with forming die 30 (or forming surface 40 thereof) and/or that may be located in contact, in direct contact, in indirect contact, and/or in physical contact with fluidly actuated support 50 (or support surface 60 thereof). Layers 92 also may be referred to herein as plies 92. Illustrative, non-exclusive examples of the material that may comprise plies 92 and/or layered charge 90 include any suitable resin-free dry pre-form, fiberglass, fiberglass cloth, carbon fiber, carbon fiber cloth, cloth, and/or pre-impregnated composite material.

It is within the scope of the present disclosure that layered charge 90 may include any suitable number of plies 92. As illustrative, non-exclusive examples, layered charge 90 may include at least 2, at least 5, at least 10, at least 20, at least 30, at least 40, and/or at least 50 plies. Additionally or alternatively, layered charge 90 may include fewer than 200, fewer than 175, fewer than 150, fewer than 125, fewer than 100, fewer than 80, fewer than 60, and/or fewer than 50 plies.

Similarly, layered charge 90 also may have and/or define any suitable thickness. As illustrative, non-exclusive examples, the thickness of layered charge 90 may be at least 1 millimeter (mm), at least 2 mm, at least 3 mm, at least 4 mm, at least 5 mm, at least 6 mm, at least 8 mm, at least 10 mm, at least 12 mm, at least 14 mm, at least 16 mm, at least 18 mm, and/or at least 20 mm. Additionally or alternatively, the thickness of layered charge 90 may be less than 40 mm, less than 35 mm, less than 30 mm, less than 25 mm, less than 20 mm, and/or less than 15 mm.

As illustrated in dashed lines in FIGS. 3-5, fluidly actuated support 50 further may include a flange plate 58. Flange plate 58 may define support surface 60. Flange plate 58 may extend above a remainder of fluidly actuated support 50, as illustrated. Additionally or alternatively, flange plate 58 may extend horizontally past the remainder of fluidly actuated support 50. As illustrative, non-exclusive examples, flange plate 58 may extend past the remainder of fluidly actuated support 50 and toward forming die 30 and/or toward a rigid standoff 96, when present.

Flange plate 58 may be a rigid, or at least substantially rigid, flange plate 58. Thus, support surface 50 may be a rigid, or at least substantially rigid, support surface 50. Alternatively, flange plate 58 may have and/or define a stiffness and/or a rigidity that is greater than a stiffness and/or a rigidity of one or more other portion(s) of fluidly actuated support 50, such as foam body 62, covering 64, bellows 66, and/or spring 68, when present. As an additional illustrative, non-exclusive example, flange plate 58 may be rigid, at least substantially rigid, stiff, and/or at least substantially stiff, in compression and/or through a thickness thereof. As another illustrative, non-exclusive example, flange plate 58 may be rigid, at least substantially rigid, stiff, at least substantially stiff, flexible, and/or at least substantially flexible in torsion and/or along a length thereof. When flange plate 58 is flexible, the flexibility also may vary along the length in any suitable manner.

When system 20 includes flange plate 58, system 20 further may include a stop 59. Stop 59 may be located and/or configured to selectively regulate an angle of flange plate 58 relative to forming die 30 (or forming surface 40 thereof) when fluidly actuated support 50 transitions between extended conformation 52 and intermediate conformation 54 and/or retracted conformation 56. As an illustrative, non-exclusive example, and as illustrated in FIG. 4, stop 59 may cause flange plate 58 to tilt at an angle relative to forming die 30 as fluidly actuated support 50 transitions from expanded conformation 52 and/or to (or toward) intermediate conformation 54 and/or retracted conformation 56.

When system 20 includes flange plate 58, system 20 also may include a restraint 61. Restraint 61 may be located and/or configured to restrict motion of flange plate 58 relative to forming die 30 as fluidly actuated support 50 transitions between extended conformation 52 and retracted conformation 56.

As illustrated in dashed lines in FIGS. 3-5, system 20 further may include a slip surface 69. Slip surface 69 may be located between fluidly actuated support 50 and layered charge 90 and/or between fluidly actuated support 50 and flange plate 58, when present, and may be selected to reduce (sliding, static, and/or kinetic) friction between fluidly actuated support 50 and layered charge 90 and/or between fluidly actuated support 50 and flange plate 58. Additionally or alternatively, slip surface 69 also may be selected to restrict and/or limit direct physical contact between fluidly actuated support 50 and layered charge 90 and/or may be formed from a material that may directly contact layered charge 90 without damage to and/or contamination of layered charge 90. It is within the scope of the present disclosure that slip surface 69 may be defined in any suitable manner. As illustrative, non-exclusive examples, slip surface 69 may be defined by covering 64, when present, may be a coating that is applied to covering 64, when present, may be a coating that is applied to foam body 62, when present, and/or may be defined by a film that covers at least a portion of fluidly actuated support 50.

As also illustrated in dashed lines in FIGS. 3-5, system 20 may include rigid standoff 96. Fluidly actuated support 50 may extend and/or be located between rigid standoff 96 and forming die 30. Rigid standoff 96 may constrain motion of fluidly actuated support 50 relative to forming die 30 and/or may limit, restrict, and/or decrease shear forces that may be applied to layered charge 90 by vacuum bag 70 during deformation of layered charge 90.

As illustrated in dash-dot lines in FIGS. 3-5, system 20 also may include an upper stretch film 76 that may extend between vacuum bag 70 and layered charge 90 and/or between a radius plate 73 and layered charge 90. Upper stretch film 76 may be selected to reduce (sliding, static, and/or kinetic) friction between vacuum bag 70 and layered charge 90 and/or between radius plate 73 and layered charge 90. Additionally or alternatively, upper stretch film 76 also may be selected to restrict and/or limit direct physical contact between vacuum bag 70 and layered charge 90 and/or between radius plate 73 and layered charge 90. As illustrated, upper stretch film 76 may extend past an edge 99 of layered charge 90, may contact support surface 60, may contact flange plate 58, may contact fluidly actuated support 50, and/or may contact a lower stretch film 71, when present. This may permit upper stretch film 76 to at least partially enclose, encompass, surround, and/or protect layered charge 90.

As also illustrated in dash-dot lines in FIGS. 3-5, system 20 also may include lower stretch film 71. Lower stretch film 71 may extend between forming die 30 and layered charge 90 and/or between fluidly actuated support 50 and layered charge 90. Lower stretch film 71 may be selected to reduce (sliding, static, and/or kinetic) friction between layered charge 90 and forming die 30 and/or between layered charge 90 and fluidly actuated support 50. Additionally or alternatively, lower stretch film 71 also may be selected to restrict and/or limit direct physical contact between layered charge 90 and forming die 30 and/or between layered charge 90 and fluidly actuated support 50. Lower stretch film 71 also may extend past edge 99 of layered charge 90, may contact support surface 60, may contact flange plate 58, may contact fluidly actuated support 50, and/or may be (at least substantially) coextensive with upper stretch film 76. This may permit lower stretch film 71 to at least partially enclose, encompass, surround, and/or protect layered charge 90.

Lower stretch film 71 and/or upper stretch film 76 may be formed from materials that may directly contact layered charge 90 without damage to and/or contamination of layered charge 90 and may be formed from the same materials or from different materials. As an illustrative, non-exclusive example, and when layered charge 90 includes a pre-impregnated composite material, lower stretch film 71 and/or upper stretch film 76 may be formed from materials that are approved for contact with the pre-impregnated composite material. Additionally or alternatively, lower stretch film 71 and/or upper stretch film 76 may be formed from a stretchy material that is configured to elastically deform during operation of forming system 20. As illustrative, non-exclusive examples, the materials of lower stretch film 71 and/or of upper stretch film 76 may be configured to elastically expand by at least 10%, at least 20%, at least 30%, at least 40%, at least 50%, at least 60%, at least 70%, at least 80%, at least 90%, at least 100%, at least 125%, at least 150%, at least 175%, at least 200%, at least 225%, at least 250%, at least 275%, at least 300%, at least 325%, at least 350%, at least 375%, or at least 400%.

As illustrated in dashed lines in FIGS. 3-5, system 20 also may include radius plate 73. Radius plate 73 may be located (at least substantially) above fluidly actuated support 50 and may extend between layered charge 90 and vacuum bag 70 and/or between upper stretch film 76 and vacuum bag 70. Radius plate 73 may be at least substantially similar to flange plate 58 and may include and/or exhibit any of the properties and/or characteristics that are discussed herein with reference to flange plate 58. In addition, radius plate 73 may include a bullnose edge 81. Bullnose edge 81 also may be referred to herein as a smooth edge 81 and/or as a rounded edge 81, and the presence of bullnose edge 81 may decrease a potential for damage to layered charge 90 due to contact therewith.

Radius plate 73, when present, may be configured to direct and/or constrain deformation of layered charge 90 during operation of system 20. As an illustrative, non-exclusive example, and as illustrated in FIG. 4, edge 81 of radius plate 73 may press against layered charge 90 during deformation of layered charge 90, thereby pressing layered charge 90 against forming surface 40 of forming die 30. As another illustrative, non-exclusive example, and as illustrated in FIGS. 3-4, application of first vacuum 82 to enclosed volume 72 may compress layered charge 90 between radius plate 73 and fluidly actuated support 50 and/or between radius plate 73 and flange plate 58.

As illustrated in FIGS. 4-5, system 20 may be configured such that radius plate 73 remains (at least substantially) above and/or coextensive with fluidly actuated support 50 during deformation of layered charge 90. As an illustrative, non-exclusive example, lower stretch film 71 and upper stretch film 76 may permit layered charge 90 to slide across support surface 60 and/or toward forming die 30 during deformation of layered charge 90.

It is within the scope of the present disclosure that radius plate 73 may have and/or define any suitable width. As illustrative, non-exclusive examples, and similar to flange plate 58, radius plate 73 may extend horizontally past fluidly actuated support 50, such as toward forming die 30 and/or toward rigid standoff 96, when present. As another illustrative, non-exclusive example, radius plate 73 may be partially, or even completely, coextensive with flange plate 58. As additional illustrative, non-exclusive examples, radius plate 73 may define a width that is less than that of fluidly actuated support 50 and/or less than that of flange plate 58.

As illustrated in dash-dot-dot lines in FIGS. 3-5, system 20 also may include a slip film 79. Slip film 79 may extend between radius plate 73 and vacuum bag 70 and may be selected to reduce (sliding, static, and/or kinetic) friction between radius plate 73 and vacuum bag 70. Slip film 79 may be at least substantially similar to lower stretch film 71 and/or to upper stretch film 76 and may include any of the properties of lower stretch film 71 and/or of upper stretch film 76 that are discussed herein. Slip film 79 may be formed from the same material as or a different material than that of lower stretch film 71 and/or of upper stretch film 76.

As also illustrated in dashed lines in FIGS. 3-5, system 20 may include a heating assembly 78 that may be configured to heat layered charge 90 prior to, during, and/or subsequent to deformation thereof. Heating assembly 78 may include and/or be any suitable structure that may heat (or be utilized to heat) layered charge 90. As illustrative, non-exclusive examples, heating assembly 78 may include and/or be an electric heater, a radiant heater, and/or a fluid heater that is configured to circulate a heated fluid in thermal contact with layered charge 90. It is within the scope of the present disclosure that heating assembly 78 may be included in any suitable portion of system 20. As illustrative, non-exclusive examples, heating assembly 78 may form a portion of forming die 30, of fluidly actuated support 50, and/or of flange plate 58. As another illustrative, non-exclusive example, heating assembly 78 may include and/or be an infrared lamp.

Figure 16:
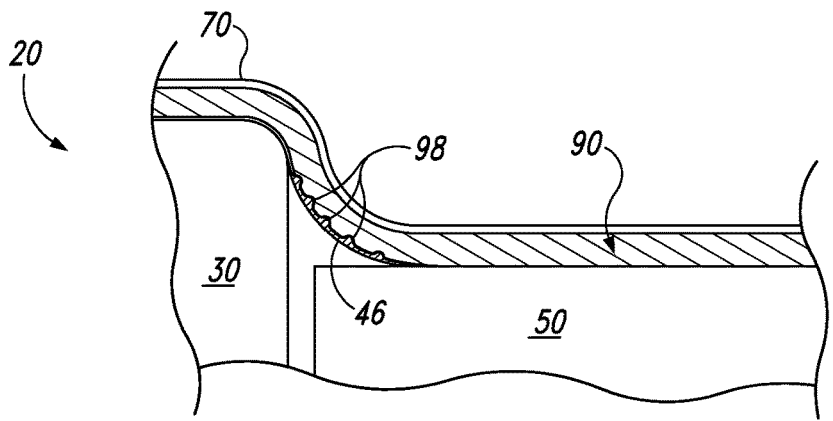
FIG. 16 is a schematic representation of a forming system that includes a wrinkle diffuser according to the present disclosure.

As further illustrated in dashed lines in FIGS. 3-5 and discussed in more detail herein with reference to FIG. 16, system 20 also may include wrinkle diffusers 49. Wrinkle diffusers 49 may be adapted, configured, and/or located to reduce wrinkling of layered charge 90 during deformation of layered charge 90 and/or during transitioning of layered charge 90 between initial conformation 91 and final conformation 93.

Figure 6:
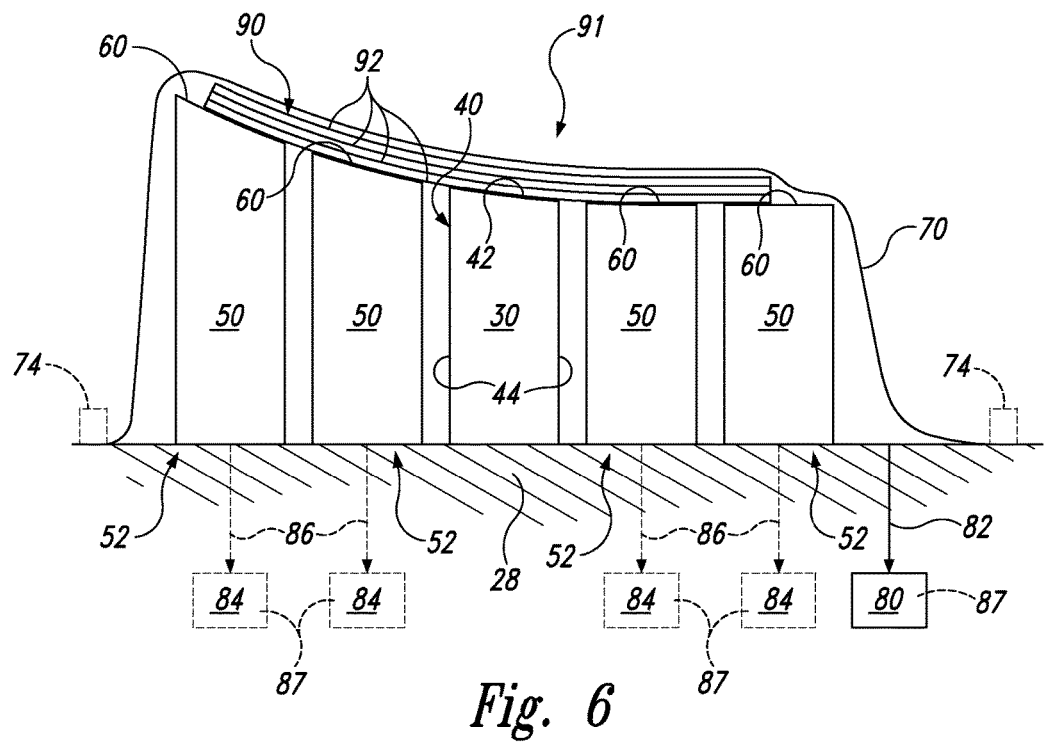
FIG. 6 is a schematic representation of illustrative, non-exclusive examples of another forming system according to the present disclosure illustrating a plurality of fluidly actuated supports in an extended conformation.
Figure 7:
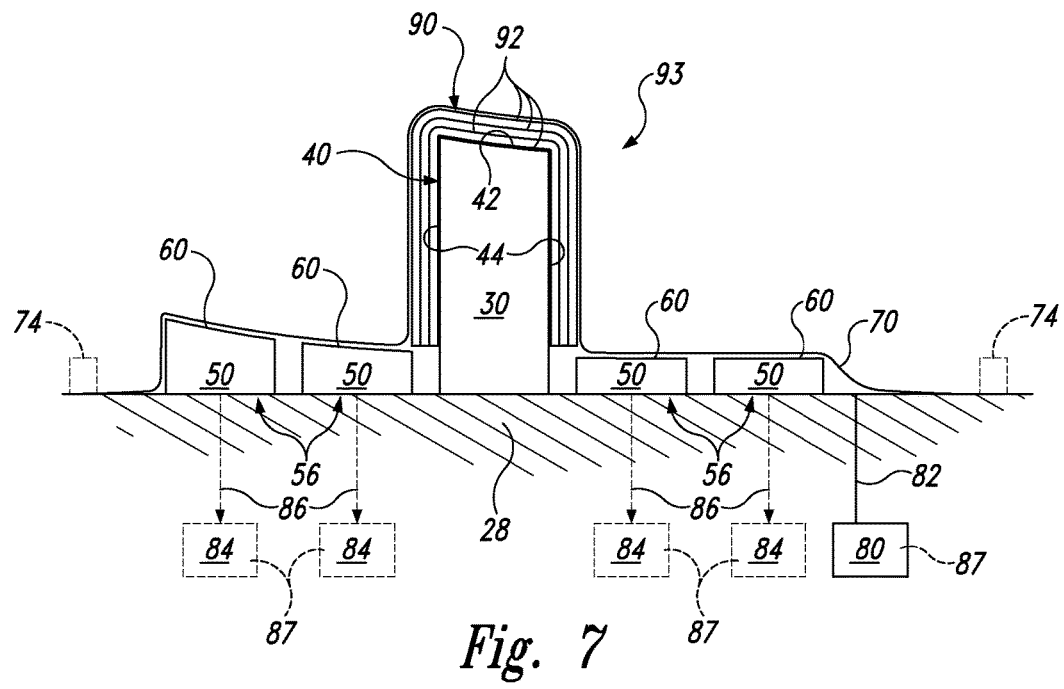
FIG. 7 is a schematic representation of illustrative, non-exclusive examples of the forming system of FIG. 6 illustrating the plurality of fluidly actuated supports in a retracted conformation.

FIGS. 6-7 are schematic representations of illustrative, non-exclusive examples of another forming system 20 according to the present disclosure. Forming system 20 of FIGS. 6-7 may include any of the structures, features, and/or components that are discussed herein, and the operation of forming system 20 of FIGS. 6-7 may be at least substantially similar to operation of forming system 20 of FIGS. 3-5. Forming system 20 of FIGS. 6-7 includes a plurality of fluidly actuated supports 50 that are arranged on opposing sides of a forming die 30. Fluidly actuated supports 50 define a plurality of support surfaces 60 that are configured to at least temporarily support a layered charge 90. The plurality of fluidly actuated supports 50 may be individually and/or selectively actuated, such as via a plurality of second vacuum sources 84, to transition between respective extended conformations 52 (as illustrated in FIG. 6) and respective retracted conformations 56 (as illustrated in FIG. 7). This may permit deformation of layered charge 90 on a forming surface 40 that is defined by forming die 30 and/or from an initial conformation 91 (as illustrated in FIG. 6) to a final conformation 93 (as illustrated in FIG. 7).

As illustrated in FIG. 6, initial conformation 91 of layered charge 90 may be a non-planar initial conformation 91. Additionally or alternatively, forming surface 40 may be a non-planar forming surface 40, support surfaces 60 may be non-planar support surfaces 60, and/or forming surface 40 and support surfaces 60 may be arranged such that layered charge 90 defines the non-planar initial conformation 91. FIGS. 8-13 are schematic representations of illustrative, non-exclusive examples of fluidly actuated supports 50 that may be included in and/or utilized with forming systems 20 according to the present disclosure. As discussed, an elasticity, a Young's modulus, a density, a percent solid volume, a viscosity, an indentation force deflection, a spring constant, a Poisson's ratio, and/or another material property of a material (such as foam body 62) that comprises fluidly actuated support 50 may vary systematically with location within fluidly actuated support 50. For simplicity, these variations will be discussed herein with reference to the elasticity and/or Young's modulus of fluidly actuated support 50; however, it is to be understood that any of the above-listed parameters also may vary in a similar manner to that described for the elasticity and/or Young's modulus.

Figure 8:
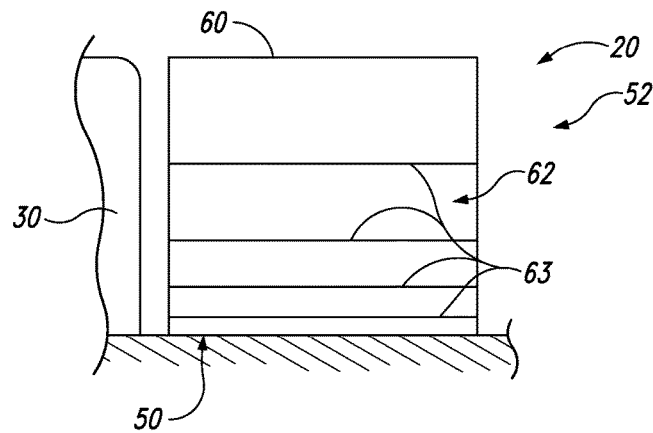
FIG. 8 is a schematic representation of a fluidly actuated support according to the present disclosure in an expanded conformation.
Figure 9:
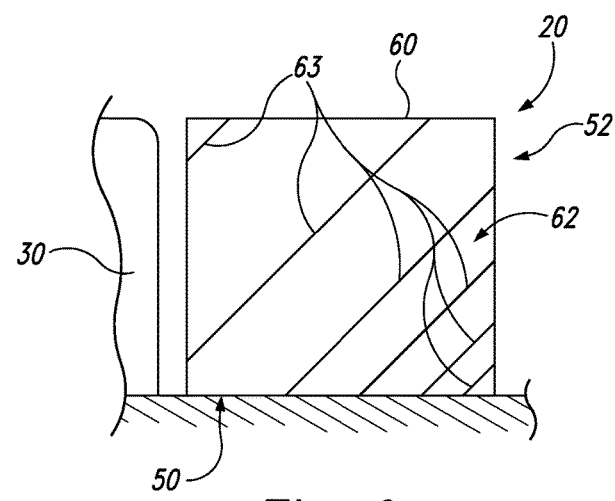
FIG. 9 is a schematic representation of another fluidly actuated support according to the present disclosure in an expanded conformation.
Figure 11:
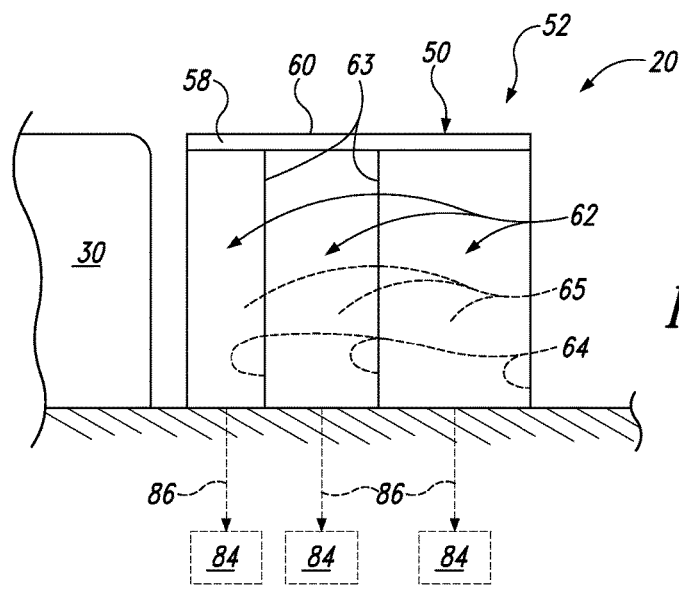
FIG. 11 is a schematic representation of another fluidly actuated support according to the present disclosure in an expanded conformation.

This is illustrated in FIGS. 8-9 and 11 by gradient lines 63, which indicate changes in (or a gradient of) the Young's modulus of foam body 62 with location within foam body 62. As an illustrative, non-exclusive example, and as illustrated in FIG. 8, the Young's modulus of foam body 62 may vary with distance from support surface 60. As another illustrative, non-exclusive example, and as illustrated in FIG. 9, the Young's modulus of foam body 62 may vary with distance from forming die 30 and with distance from support surface 60. As yet another illustrative, non-exclusive example, and as illustrated in FIG. 11, the Young's modulus of foam body 62 may vary with distance from forming die 30.

It is within the scope of the present disclosure that the Young's modulus of foam body 62 may be (relatively) greater in regions of foam body 62 that are more distal from forming die 30 and/or from support surface 60 relative to regions of foam body 62 that are more proximal to forming die 30 and/or to support surface 60. Additionally or alternatively, it is also within the scope of the present disclosure that the Young's modulus of foam body 62 may be (relatively) greater in regions of foam body 62 that are more proximal to forming die 30 and/or to support surface 60 relative to regions of foam body 62 that are more distal from forming die 30 and/or from support surface 60.

The variation in elasticity (or Young's modulus) of foam body 62 may be accomplished in any suitable manner. As an illustrative, non-exclusive example, foam body 62 may include and/or be defined by a plurality of layers of foam and an elasticity of at least one of the plurality of layers of foam may be different from an elasticity of at least one other of the plurality of layers of foam.

Figure 10:
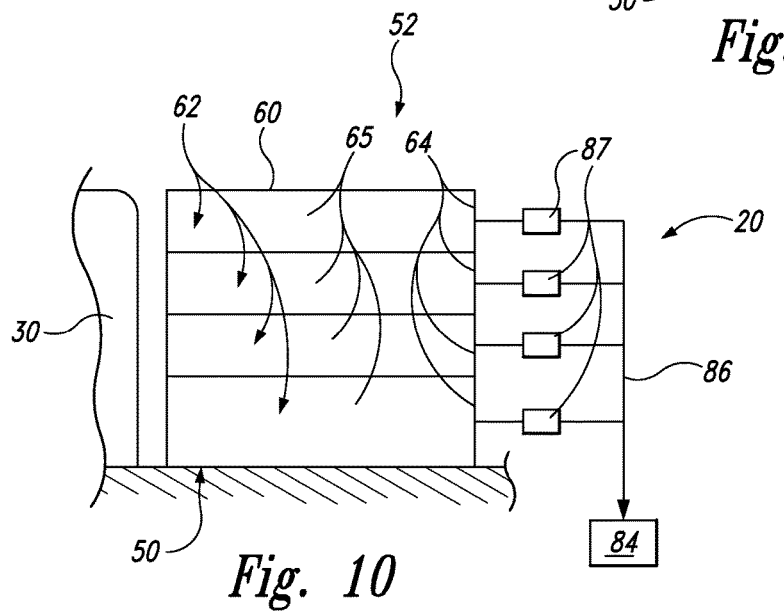
FIG. 10 is a schematic representation of another fluidly actuated support according to the present disclosure in an expanded conformation.

As illustrated in FIGS. 10-11, fluidly actuated support 50 may include a plurality of foam bodies 62 and a respective plurality of coverings 64 that define a plurality of covered volumes 65. Under these conditions, second vacuum system 84 may be configured to selectively and/or independently apply second vacuum 86 to individual covered volumes 65, thereby permitting selective, controlled, and/or regulated transitioning of fluidly actuated support 50 between the extended conformation 52 and the retracted conformation 56. As an illustrative, non-exclusive example, and as illustrated in FIG. 10, system 20 may include a plurality of valves 87 that may be utilized to selectively control application of second vacuum 86. As another illustrative, non-exclusive example, and as illustrated in FIG. 11, system 20 may include a plurality of second vacuum systems 84, with each of the plurality of second vacuum systems 84 being configured to selectively apply a respective second vacuum 86 to a respective covered volume 65.

It is within the scope of the present disclosure that the systems and methods disclosed herein also may be utilized to control and/or vary deformation of layered charge 90 along a length of forming die 30. As an illustrative, non-exclusive example, a material property of fluidly actuated support 50 may vary along the length of forming die 30. As a more specific but still illustrative, non-exclusive example, a rigidity of foam body 62 may vary along the length of forming die 30. Under these conditions, regions of foam body 62 with a (relatively) lower rigidity may compress more quickly than regions of foam body 62 with a (relatively) higher rigidity. Thus, portion(s) of layered charge 90 that are in contact with the regions of foam body 62 with the relative lower rigidity may deform more quickly and/or to a greater extent than regions of layered charge 90 that are in contact with the regions of foam body 62 with the relatively higher rigidity.

As another illustrative, non-exclusive example, a plurality of separate and/or distinct fluidly actuated supports 50 may extend along the length of forming die 30. At least a portion of this plurality of separate fluidly actuated supports 50 may be associated with and/or in fluid communication with respective separate and/or distinct second vacuum sources 84. Under these conditions, the respective second vacuum sources 84 may be utilized to separately and/or independently control and/or regulate compression of the respective fluidly actuated supports 50, thereby permitting some regions of layered charge 90 to be deformed at a different rate and/or to a greater extent than other regions of layered charge 90.

Figure 12:
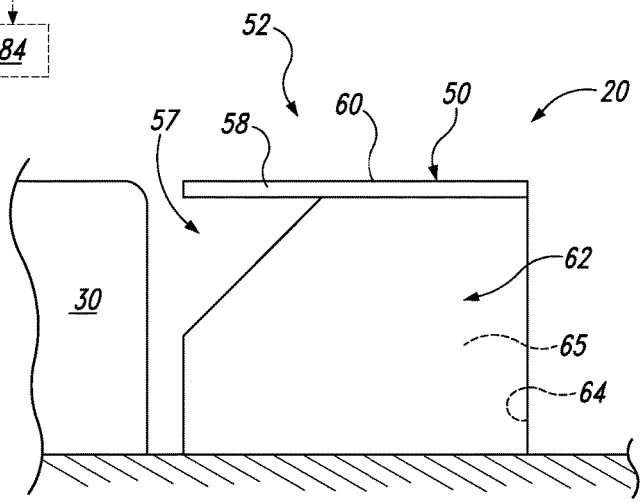
FIG. 12 is a schematic representation of another fluidly actuated support according to the present disclosure in an expanded conformation.
Figure 13:
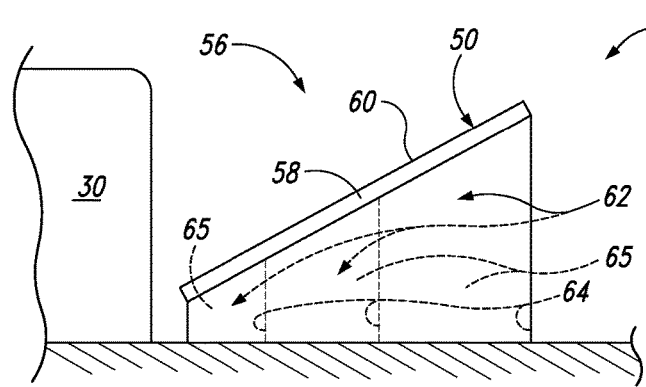
FIG. 13 is a schematic representation of the fluidly actuated support of FIG. 9 or 11-12 in a retracted conformation.

As illustrated in FIG. 12, fluidly actuated support 50 also may include a foam body 62 that has and/or defines one or more gaps beneath a flange plate 58. Gaps 57 may be selectively positioned at any location within fluidly actuated support 50, within foam body 62, and/or beneath flange plate 58 and may be utilized to control and/or regulate an orientation of flange plate 58 when fluidly actuated support 50 transitions from an extended conformation 52 (as illustrated in FIGS. 8-12) to a retracted conformation 56 (as illustrated in FIG. 13). As an illustrative, non-exclusive example, and as illustrated in FIG. 13, gaps 57 may be located such that flange plate 58 tilts relative to forming die 30 as fluidly actuated support 50 transitions to retracted conformation 56. This tilting may be utilized to control and/or regulate deformation of layered charge 90.

It is also within the scope of the present disclosure that the distribution of material properties of foam body (or bodies) 62 may be utilized to generate the tilt of flange plate 58 that is illustrated in FIG. 13. As illustrative, non-exclusive examples, the material properties of foam bodies 62 of FIGS. 9 and 11 may cause the tilt of flange plate 58 that is illustrated in FIG. 13.

Figure 14:
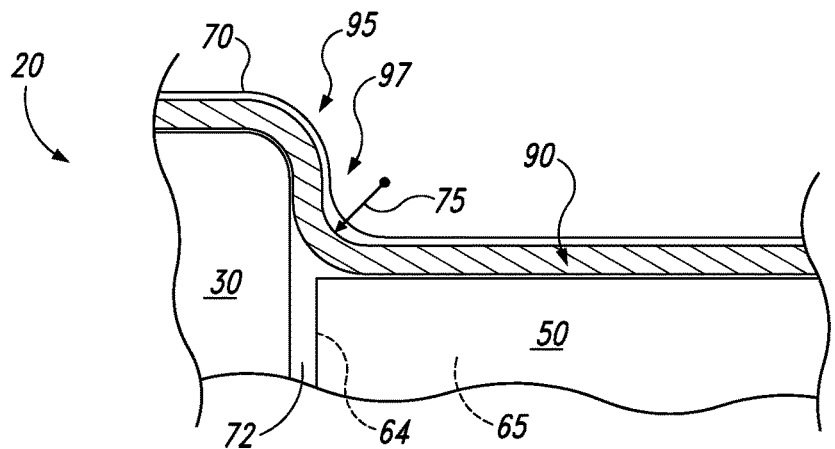
FIG. 14 is a schematic representation of a forming system according to the present disclosure deforming a layered charge of material.
Figure 15:
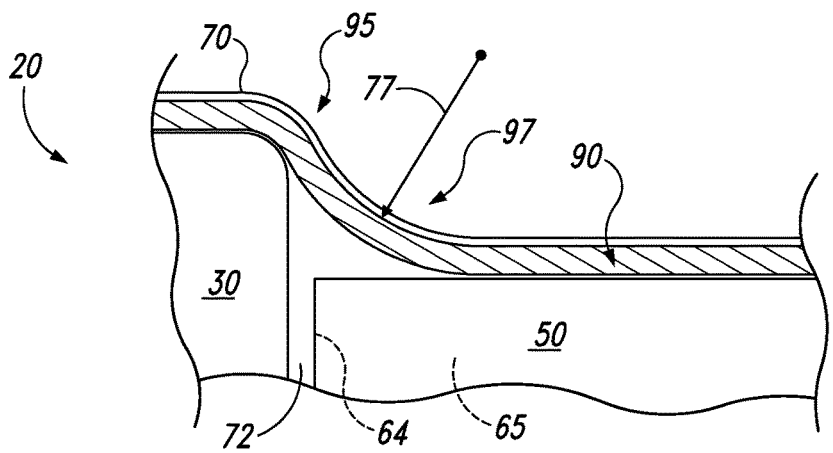
FIG. 15 is another schematic representation of a forming system according to the present disclosure deforming a layered charge of material.

The systems and methods according to the present disclosure may permit separate and/or independent control of a compaction of layered charge 90, a rate of deformation of layered charge 90, and/or an amount of strain that is experienced by layered charge 90 during deformation thereof. This is illustrated schematically in FIGS. 14-15. In FIGS. 14-15, a forming system 20 according to the present disclosure is deforming a layered charge 90 to produce a first bend 95 and a second bend 97. As discussed, a degree of evacuation of enclosed volume 72 may be regulated to regulate compaction of layered charge 90 due to atmospheric pressure forces that may be applied thereto via vacuum bag 70. In addition, and as also discussed, a rate at which fluidly actuated support 50 transitions between the extended conformation 52 and the retracted conformation 56 also may be regulated and/or controlled, such as via selection of the materials of construction of fluidly actuated support 50 and/or via application of a separate (i.e., second) vacuum to covered volume 65.

This independent and/or selective control of the compaction of layered charge 90 and the rate at which fluidly actuated support 50 transitions between respective conformations thereof may be utilized to control and/or regulate the deformation of layered charge 90. As an illustrative, non-exclusive example, and as illustrated in FIG. 14, a (relatively) greater degree of evacuation of enclosed volume 72 and/or a (relatively) slower rate at which fluidly actuated support 50 transitions between respective conformations thereof may cause second bend 97 of layered charge 90 to be deformed to a first radius of curvature 75. Additionally or alternatively, and as illustrated in FIG. 15, a (relatively) lower degree of evacuation of enclosed volume 72 and/or a (relatively) faster rate at which fluidly actuated support 50 transitions between respective conformations thereof may cause second bend 97 of layered charge 90 to be deformed to a second radius of curvature 77. The second radius of curvature may be different from, or greater than, the first radius of curvature due to the different forces, magnitude of forces, and/or rate of application of forces that may be experienced by layered charge 90 under the conditions of FIG. 14 when compared to FIG. 15.

It is within the scope of the present disclosure that second bend 97 may define, or be regulated to define, any suitable radius of curvature. As illustrative, non-exclusive examples, the radius of curvature of second bend 97 (i.e., first radius of curvature 75 and/or second radius of curvature 77) may be at least 1 centimeters (cm), at least 2 cm, at least 3 cm, at least 4 cm, at least 6 cm, at least 8 cm, and/or at least 10 cm. Additionally or alternatively, the radius of curvature of second bend 97 also may be less than 30 cm, less than 28 cm, less than 26 cm, less than 24 cm, less than 22 cm, less than 20 cm, less than 18 cm, less than 16 cm, less than 14 cm, less than 12 cm, less than 10 cm, less than 8 cm, less than 6 cm, less than 5 cm, less than 4 cm, and/or less than 3 cm.

FIG. 16 is a schematic representation of a forming system 20 that includes a wrinkle diffuser 46 according to the present disclosure. As illustrated, wrinkle diffuser 46 may include a periodic and/or undulating surface that is configured to contact layered charge 90 and to generate, produce, and/or induce surface undulations 98 within layered charge 90. Generally, wrinkle diffuser 46 may be located and/or placed in contact with portion(s) of layered charge 90 that bend, deform, and/or are strained during deformation of layered charge 90 and/or when layered charge 90 transitions from the initial conformation 91 to the final conformation 93. As an illustrative, non-exclusive example, and as illustrated in FIG. 16, wrinkle diffuser 46 may be located and/or placed between fluidly actuated support 50 and layered charge 90. Additionally or alternatively, wrinkle diffuser 46 also may be located and/or placed between vacuum bag 70 and layered charge 90.

Figure 17:
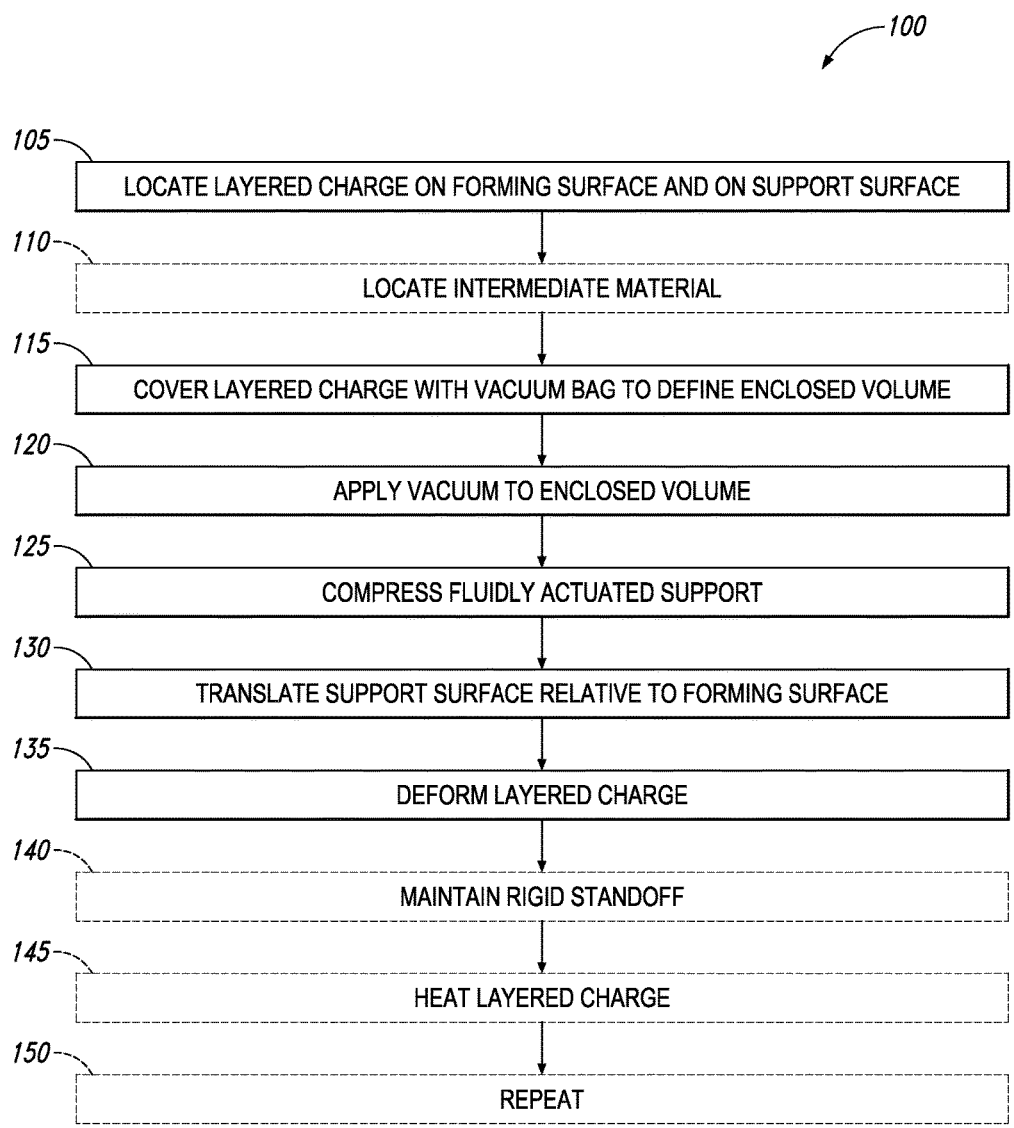
FIG. 17 is a flowchart depicting methods, according to the present disclosure, of defining a desired surface contour in a layered charge of material.

FIG. 17 is a flowchart depicting methods 100, according to the present disclosure, of defining a desired surface contour in a layered charge of material. Methods 100 include locating a layered charge on a forming surface and on a support surface at 105 and may include locating an intermediate material at 110. Methods 100 further include covering the layered charge with a vacuum bag to define an enclosed volume at 115, applying a vacuum to the enclosed volume at 120, compressing a fluidly actuated support at 125, translating the support surface relative to the forming surface at 130, and/or deforming the layered charge at 135. Methods 100 further may include maintaining a rigid standoff at least substantially fixed in space at 140, heating the layered charge at 145, and/or repeating at least a portion of the methods at 150.

Locating the layered charge on the forming surface and on the support surface at 105 may include locating the layered charge on a forming die, which may define the forming surface, and locating the layered charge on the fluidly actuated support, which may define the support surface. The fluidly actuated support may be adjacent to the forming die and/or the support surface may be adjacent to the forming surface such that the (or a single) layered charge may extend across and/or be supported by both the forming surface and the support surface. Thus, the locating at 105 may include establishing contact, establishing physical contact, establishing direct contact, and/or establishing indirect contact between the layered charge and the forming surface and between the layered charge and the support surface. The locating at 105 also may include aligning and/or centering the layered charge relative to the forming surface and/or relative to the support surface.

Locating the intermediate material at 110 may include locating any suitable intermediate material at any suitable location within the forming system. As an illustrative, non-exclusive example, the locating at 110 may include locating a sacrificial slip film between the fluidly actuated support and the layered charge. The sacrificial slip film may be configured and/or selected to decrease friction between the fluidly actuated support and the layered charge. Thus, locating the sacrificial slip film may include reducing friction between the fluidly actuated support and the layered charge. Additionally or alternatively, the sacrificial slip film also may be configured and/or selected to restrict physical contact between the fluidly actuated support and the layered charge. Thus, locating the sacrificial slip film may include restricting physical (or direct physical) contact between the fluidly actuated support and the layered charge.

As another illustrative, non-exclusive example, the locating at 110 additionally or alternatively may include locating a stretch film between the vacuum bag and the layered charge. The stretch film may be configured and/or selected to decrease friction between the vacuum bag and the layered charge. Thus, locating the stretch film may include reducing friction between the vacuum bag and the layered charge. Additionally or alternatively, the stretch film also may be configured and/or selected to restrict physical contact between the vacuum bag and the layered charge. Thus, locating the stretch film may include restricting physical (or direct physical) contact between the vacuum bag and the layered charge. The stretch film also may be configured to maintain at least a portion of the layered charge in tension during the deforming at 135.

As yet another illustrative, non-exclusive example, the locating at 110 additionally or alternatively may include locating a wrinkle diffuser in contact with the layered charge. This may include locating the wrinkle diffuser between the layered charge and the vacuum bag and/or locating the wrinkle diffuser between the layered charge and the fluidly actuated support. When the locating at 110 includes locating the wrinkle diffuser, methods 100 further may include inducing surface undulations within the layered charge with the wrinkle diffuser and/or resisting wrinkling of the layered charge during the deforming at 135 with, or via, the wrinkle diffuser.

Covering the layered charge with the vacuum bag to define the enclosed volume at 115 may include covering such that the enclosed volume includes and/or contains the forming surface, the support surface, and/or the layered charge. This may include fluidly isolating the enclosed volume from an ambient environment that surrounds the enclosed volume and/or restricting fluid communication between the ambient environment and the enclosed volume.

Applying the vacuum to the enclosed volume at 120 may include applying the vacuum and/or at least partially evacuating the enclosed volume in any suitable manner. It is within the scope of the present disclosure that the applying at 120 further may include vacuum compacting the layered charge, as discussed herein. The applying at 120 may be performed with any suitable timing and/or with any suitable sequence within methods 100. As an illustrative, non-exclusive example, the applying at 120 may be performed prior to the compressing at 125, and/or methods 100 may include applying the vacuum at 120 for at least an initial application time prior to initiation of the compressing at 125. Thus, the compressing at 125 may be performed independently from the applying at 120. As another illustrative, non-exclusive example, the applying at 120 and the compressing at 125 may be initiated simultaneously. Thus, the compressing at 125 may be performed responsive to the applying at 120. As yet another illustrative, non-exclusive example, the applying at 120 and the compressing at 125 may be performed at least partially, or even completely, concurrently.

Compressing the fluidly actuated support at 125 may include compressing the fluidly actuated support in any suitable manner. As an illustrative, non-exclusive example, the compressing at 125 may include transitioning the fluidly actuated support from an extended conformation to a retracted conformation. As discussed, the compressing at 125 may be performed and/or initiated responsive, or directly responsive, to the applying at 120. As an illustrative, non-exclusive example, and as discussed in more detail herein, the fluidly actuated support may include a foam body that is compressed as a result of the applying at 125.

Additionally or alternatively, and as also discussed, the compressing at 125 also may be performed and/or initiated independently from the applying at 120. As an illustrative, non-exclusive example, the fluidly actuated support may include a foam body that is covered by a covering that defines a covered volume. Additionally or alternatively, the fluidly actuated support may include a bellows that defines the covered volume. The covered volume may be fluidly isolated from the enclosed volume. Under these conditions, the applying at 120 may include applying a first vacuum to the covered volume and the compressing at 125 may include applying a second vacuum to the covered volume. The second vacuum may be, or may be applied independently from, the first vacuum.

Methods 100 further may include regulating a rate of compression of the fluidly actuated support by regulating a rate of application of a vacuum, such as the first vacuum and/or the second vacuum, and/or by regulating a pressure, such as a pressure within enclosed volume 72 and/or within covered volume 65. This may include regulating a rate of deformation of the layered charge (such as during the deforming at 135) and/or regulating a radius of curvature of the layered charge (such as a radius of curvature of first bend 95 and/or of second bend 97, as illustrated in FIGS. 4-5 and 14-15) during the deforming at 135.

As an illustrative, non-exclusive example, methods 100 may include increasing the rate of application of the vacuum to increase the radius of curvature and/or increase the rate of deformation. Additionally or alternatively, methods 100 also may include decreasing the rate of application of the vacuum to decrease the radius of curvature and/or decrease the rate of deformation.

As another illustrative, non-exclusive example, methods 100 may include increasing the pressure to decrease compression of (or expand) the fluidly actuated support. Additionally or alternatively, methods 100 also may include decreasing the pressure to increase compression of (or contract) the fluidly actuated support.

The vacuum may have any suitable magnitude. As illustrative, non-exclusive examples, the vacuum may be, may be at least, and/or may be less than 15 kilopascals (kPa), 20 kPa, 25 kPa, 30 kPa, 35 kPa, 40 kPa, 45 kPa, 50 kPa, 55 kPa, 60 kPa, 65 kPa, 70 kPa, 75 kPa, and/or 80 kPa. This also may include vacuum levels that are between any of the above-listed values. Additionally or alternatively, the regulating the rate of application of the vacuum may include regulating a rate of change of the vacuum to be, to be at least, or to be less than, 1 kilopascal per minute (kPa/min), 2 kPa/min, 3 kPa/min, 4 kPa/min, 5 kPa/min, 7.5 kPa/min, 10 kPa/min, 15 kPa/min, 20 kPa/min, 30 kPa/min, 40 kPa/min, 50 kPa/min, 60 kPa/min, 70 kPa/min, 80 kPa/min, 90 kPa/min, and/or 100 kPa/min. This also may include rates of change of the vacuum that are between any of the above-listed values.

Translating the support surface relative to the forming surface at 130 may include translating responsive to, as a result of, and/or concurrently with the compressing at 125. Additionally or alternatively, the translating at 130 also may include translating to produce the deforming at 135. As an illustrative, non-exclusive example, the translating at 130 may include translating the support surface away from the forming surface, translating a plane of the support surface away from a plane of the forming surface, and/or translating the support surface in a vertical direction relative to the forming surface. It is within the scope of the present disclosure that the translating at 130 may include resisting motion of the support surface relative to the forming surface in a lateral direction that is perpendicular to the vertical direction. For example, the vertical direction may be at least substantially perpendicular to a plane that is defined by the support surface, while the lateral direction may be at least substantially parallel to the plane that is defined by the support surface.

The translating at 130 may include increasing a fraction of the layered charge that is supported by and/or in contact with the forming surface. Additionally or alternatively, the translating at 130 also may include decreasing a fraction of the layered charge that is supported by and/or in contact with the support surface. This may include sliding, conveying, and/or otherwise translating the layered charge across the support surface to transfer the layered charge from the support surface to the forming surface. Under these conditions, methods 100 further may include selecting a frictional force between the support surface and the layered charge such that the frictional force maintains a desired, or target, level of tension in the layered charge during the sliding. The frictional force may be selected in any suitable manner. As illustrative, non-exclusive examples, the frictional force may be selected by selecting one or more of a surface roughness of the support surface, a surface energy of the support surface, an adhesive force between the layered charge and the support surface, a surface texture of the support surface, a surface roughness of a sacrificial slip film that extends between the layered charge and the support surface (such as may be located during the locating at 110), a surface energy of the sacrificial slip film, an adhesive force between the layered charge and the sacrificial slip film, an adhesive force between the support surface and the sacrificial slip film, and/or a surface texture of the sacrificial slip film.

Deforming the layered charge at 135 may include deforming the layered charge to define the desired surface contour. The deforming at 135 may be performed responsive to, concurrently with, and/or as a result of the compressing at 125 and/or the translating at 130. In addition, the deforming at 135 may include retaining the layered charge in contact with the forming surface and with the support surface, such as via a vacuum force that is generated by the applying at 120, during at least a portion of the translating at 130.

As discussed herein, the deforming at 135 may include establishing a first bend in the layered charge and establishing a second bend within the layered charge. The first bend may be proximal to and/or in contact with an edge of the forming die, and the second bend may be proximal to an interface between the forming die and the fluidly actuated support. The deforming at 135 may include deforming such that the first bend and/or the second bend define any suitable radius of curvature, illustrative, non-exclusive examples of which are disclosed herein.

Methods 100 may include maintaining the support surface at least substantially parallel to the forming surface during the deforming at 135. Alternatively, methods 100 also may include tilting the support surface relative to the forming surface during the deforming at 135.

As discussed in more detail herein, a forming system that utilizes methods 100 may include a rigid standoff, and the fluidly actuated support may extend between the rigid standoff and the forming die. Under these conditions, methods 100 further may include maintaining, at 140, the rigid standoff at least substantially fixed in space, or immobile, during the compressing at 125, during the translating at 130, and/or during the deforming at 135.

Heating the layered charge at 145 may include heating the layered charge in any suitable manner. As illustrative, non-exclusive examples, the heating at 145 may include heating at least a portion of the fluidly actuated support, heating at least a portion of the forming die, electrically heating, and/or radiantly heating. As more specific but still illustrative, non-exclusive examples, the heating at 145 may include directing a heat lamp onto the layered charge to heat the layered charge and/or electrically heating the support surface and/or the forming surface to heat the layered charge.

The heating at 145 may be performed at any suitable time and/or with any suitable sequence within methods 100. As illustrative, non-exclusive examples, the heating at 145 may include heating prior to the applying at 120, heating prior to the compressing at 125, heating prior to the translating at 130, heating prior to the deforming at 135, heating concurrently with the applying at 120, heating concurrently with the compressing at 125, heating concurrently with the translating at 130, and/or heating concurrently with the deforming at 135.

Repeating at least a portion of the methods at 150 may include repeating any suitable portion of methods 100. As an illustrative, non-exclusive example, the layered charge may be a first layered charge, and the repeating at 150 may include repeating the locating at 105 with a second layered charge and repeating the covering at 115, the applying at 120, the compressing at 125, the translating at 130, and/or the deforming at 135 to define the desired surface contour in the second layered charge.

Figure 18:
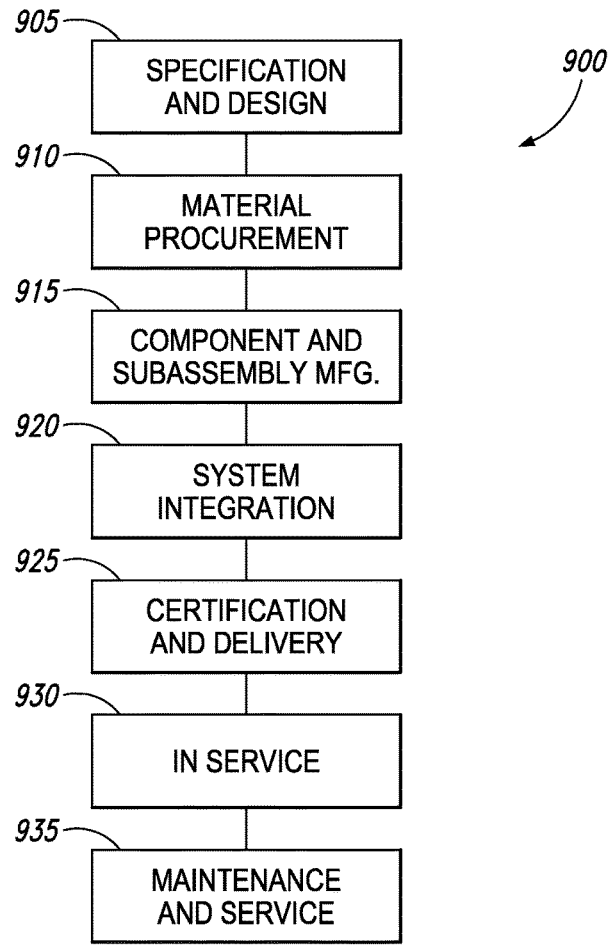
FIG. 18 is a flow diagram of aircraft production and service methodology.
Figure 19:
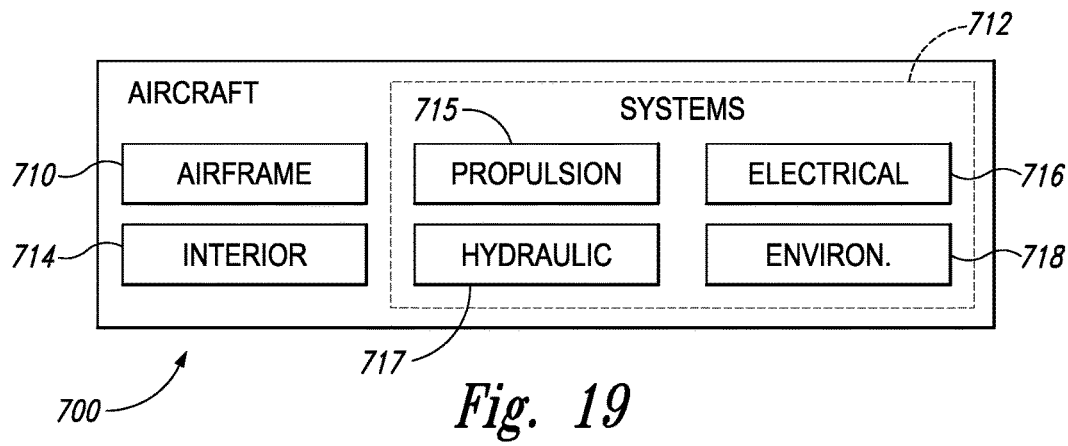
FIG. 19 is a block diagram of an aircraft.

Referring now to FIGS. 18-19, embodiments of the disclosure may be described in the context of an aircraft manufacturing and service method 900, as shown in FIG. 18, and an aircraft 700, as shown in FIG. 19. During preproduction, exemplary method 900 may include specification and design 905 of the aircraft 700 and material procurement 910. During production, component and subassembly manufacturing 915 and system integration 920 of the aircraft 700 take place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 19, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

System and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more system embodiments, method embodiments, or a combination thereof may be utilized during the production stages 915 and 920, for example, by substantially expediting assembly of or reducing the cost of an aircraft 700. Similarly, one or more of system embodiments, method embodiments, or a combination thereof may be utilized while the aircraft 700 is in service, for example and without limitation, to maintenance and service 935.

Illustrative, non-exclusive examples of inventive subject matter according to the present disclosure are described in the following enumerated paragraphs:

A1. A forming system for deforming a layered charge of material from an initial conformation to a final conformation to define a desired surface contour of the layered charge, the system comprising:

a forming die having a forming surface that is shaped to at least partially define the desired surface contour of the layered charge;

a fluidly actuated support having a support surface that is adjacent to the forming surface and located to at least temporarily support a portion of the layered charge;

a vacuum bag that at least partially defines an enclosed volume that contains the forming surface and the support surface; and a vacuum source that is configured to selectively apply a vacuum to the enclosed volume.

A2. The system of paragraph A1, wherein a forming surface contour of the forming surface corresponds to the desired surface contour of the layered charge.

A3. The system of any of paragraphs A1-A2, wherein the forming surface includes an initial contact region and a subsequent contact region, wherein the initial contact region is configured to contact the layered charge when the layered charge is in the initial conformation, and further wherein both the initial contact region and the subsequent contact region are configured to contact the layered charge when the layered charge is in the final conformation.

A3.1 The system of paragraph A3, wherein the initial contact region is (at least substantially) planar.

A3.2 The system of any of paragraphs A3-A3.1, wherein the support surface is adjacent to the initial contact region when the layered charge is in the initial conformation.

A3.3 The system of any of paragraphs A3-A3.2, wherein the support surface is (at least substantially) coplanar with the initial contact region when the layered charge is in the initial conformation.

A4. The system of any of paragraphs A1-A3.3, wherein the fluidly actuated support is configured to transition among a plurality of conformations between an extended conformation and a retracted conformation.

A4.1 The system of paragraph A4, wherein, when the fluidly actuated support is in the extended conformation, the layered charge is supported by the support surface and by a/the initial contact region of the forming surface.

A4.2 The system of any of paragraphs A4-A4.1, wherein, when the fluidly actuated support is in the retracted conformation, the layered charge is supported by a/the initial contact region of the forming surface and by a/the subsequent contact region of the forming surface.

A4.3 The system of any of paragraphs A4-A4.2, wherein the fluidly actuated support is configured to transition between the extended conformation and the retracted conformation responsive to a pressure within the enclosed volume.

A5. The system of any of paragraphs A1-A4.3, wherein a/the initial contact region of the forming surface defines an edge profile, and further wherein at least a portion of the fluidly actuated support is shaped to correspond to the edge profile of the initial contact region.

A6. The system of any of paragraphs A1-A5, wherein the fluidly actuated support includes a foam body.

A6.1 The system of paragraph A6, wherein the foam body is expanded when the fluidly actuated support is in a/the extended conformation.

A6.2 The system of any of paragraphs A6-A6.1, wherein the foam body is compressed when the fluidly actuated body is in a/the retracted conformation.

A6.3 The system of any of paragraphs A6-A6.2, wherein a Young's modulus of the foam body varies systematically with location within the foam body.

A6.4 The system of any of paragraphs A6-A6.3, wherein a/the Young's modulus of the foam body is relatively greater in regions of the foam body that are more distal from the forming die when compared to regions of the foam body that are more proximal to the forming die.

A6.5 The system of any of paragraphs A6-A6.4, wherein a/the Young's modulus of the foam body is relatively greater in regions of the foam body that are more proximal to the forming die when compared to regions of the foam body that are more distal from the forming die.

A6.6 The system of any of paragraphs A6-A6.2, wherein a Young's modulus of the foam body is at least substantially constant throughout the foam body.

A6.7 The system of any of paragraphs A6-A6.6, wherein the foam body includes a plurality of layers of foam.

A6.7.1 The system of paragraph A6.7, wherein a Young's modulus of at least one of the plurality of layers of foam is different from a Young's modulus of at least one other of the plurality of layers of foam.

A6.8 The system of any of paragraphs A6-A6.7.1, wherein the fluidly actuated support includes a covering that defines a covered volume that includes the foam body.

A6.8.1 The system of paragraph A6.8, wherein the covering fluidly isolates the foam body from the enclosed volume.

A6.9 The system of any of paragraphs A6-A6.8.1, wherein the fluidly actuated support includes a plurality of foam bodies and a plurality of coverings, wherein the plurality of coverings defines a plurality of covered volumes, and further wherein each covered volume of the plurality of covered volumes includes a respective foam body of the plurality of foam bodies.

A6.9.1 The system of paragraph A6.9, wherein the system is configured to apply a respective vacuum to at least one of the plurality of covered volumes independently from at least one other of the plurality of covered volumes.

A7. The system of any of paragraphs A1-A6.9.1, wherein the fluidly actuated support includes a fluidly actuated bellows that defines a covered volume.

A7.1 The system of paragraph A7, wherein the fluidly actuated bellows includes a spring that is configured to bias the fluidly actuated support to an/the extended conformation.

A8. The system of any of paragraphs A6.8-A7.1, wherein the system further includes a vacuum manifold that is in fluid communication with the covered volume.

A8.1 The system of paragraph A8, wherein the vacuum source is a first vacuum source, wherein the vacuum is a first vacuum, and further wherein the system includes a second vacuum source that is configured to selectively apply a second vacuum to the covered volume.

A8.1.1 The system of paragraph A8.1, wherein the second vacuum source is configured to selectively apply the second vacuum independent from application of the first vacuum by the first vacuum source.

A8.2 The system of any of paragraphs A8-A8.1.1, wherein the vacuum manifold includes a plurality of vacuum holes that provide fluid communication between the covered volume and the second vacuum source.

A8.2.1 The system of paragraph A8.2, wherein a spatial distribution of the plurality of vacuum holes is selected to provide (at least substantially) uniform compression of the fluidly actuated support upon application of the second vacuum.

A8.2.2 The system of paragraph A8.2, wherein a spatial distribution of the plurality of vacuum holes is selected to provide non-uniform compression of the fluidly actuated support upon application of the second vacuum.

A9. The system of any of paragraphs A1-A8.2.2, wherein the vacuum bag is a flexible vacuum bag.

A10. The system of any of paragraphs A1-A9, wherein the vacuum bag extends across the forming die and the fluidly actuated support.

A11. The system of any of paragraphs A1-A10, wherein the vacuum bag is configured to conform to a shape of the forming die and the fluidly actuated support.

A12. The system of any of paragraphs A1-A11, wherein the vacuum source includes a vacuum pump.

A13. The system of any of paragraphs A1-A12, wherein the system includes a vacuum valve that is configured to selectively apply the vacuum from the vacuum source to the enclosed volume.

A14. The system of any of paragraphs A1-A13, wherein the fluidly actuated support further includes a flange plate.

A14.1 The system of paragraph A14, wherein the flange plate defines the support surface of the fluidly actuated support.

A14.2 The system of any of paragraphs A14-A14.1, wherein the flange plate is a rigid, or at least substantially rigid, flange plate.

A14.3 The system of any of paragraphs A14-A14.2, wherein the system further includes a stop that is located to selectively regulate an angle of the flange plate relative to the forming die when the fluidly actuated support transitions between an/the extended conformation and a/the retracted conformation.

A14.4 The system of any of paragraphs A14-A14.3, wherein the system further includes a restraint that is configured to restrict motion of the flange plate relative to the forming die.

A15. The system of any of paragraphs A1-A14.4, wherein the system further includes a sacrificial slip film that is located between the fluidly actuated support and the layered charge, optionally wherein the sacrificial slip film is selected to at least one of (i) selected to reduce friction between the fluidly actuated support and the layered charge; and (ii) located to restrict direct physical contact between the fluidly actuated support and the layered charge.

A16. The system of any of paragraphs A1-A15, wherein the system further includes a rigid standoff, wherein the fluidly actuated support extends between the forming die and the rigid standoff.

A17. The system of any of paragraphs A1-A16, wherein the system further includes a stretch film that extends between the vacuum bag and the layered charge, and optionally wherein the stretch film is at least one of (i) selected to reduce friction between the vacuum bag and the layered charge; (ii) located to restrict direct physical contact between the vacuum bag and the layered charge; and (iii) selected to maintain at least a portion of the layered charge in tension during deformation of the layered charge.

A18. The system of any of paragraphs A1-A17, wherein the system includes the layered charge.

A18.1 The system of paragraph A18, wherein the layered charge includes a plurality of plies of the material.

A18.1.1 The system of paragraph A18.1, wherein the plurality of plies includes at least one of:
(i) at least 2, at least 5, at least 10, at least 20, at least 30, at least 40, or at least 50 plies; and
(ii) fewer than 200, fewer than 175, fewer than 150, fewer than 125, fewer than 100, fewer than 80, fewer than 60, or fewer than 50 plies.

A18.2 The system of any of paragraphs A18-A18.1.1, wherein the material includes a pre-impregnated composite material.

A18.3 The system of any of paragraphs A18-A18.2, wherein the material includes at least one of a resin-free dry pre-form, a fiberglass, a fiberglass cloth, carbon fibers, a carbon cloth, and a cloth.

A18.4 The system of any of paragraphs A18-A18.3, wherein the layered charge defines a thickness of at least one of:
(i) at least 1 millimeter (mm), at least 2 mm, at least 3 mm, at least 4 mm, at least 5 mm, at least 6 mm, at least 8 mm, at least 10 mm, at least 12 mm, at least 14 mm, at least 16 mm, at least 18 mm, or at least 20 mm; and
(ii) less than 40 mm, less than 35 mm, less than 30 mm, less than 25 mm, less than 20 mm, or less than 15 mm.

A19. The system of any of paragraphs A1-A18.4, wherein the system further includes a heating assembly that is configured to heat the layered charge.

A19.1 The system of paragraph A19, wherein the heating assembly forms a portion of the forming die.

A19.2 The system of any of paragraphs A19-A19.1, wherein the heating assembly forms a portion of the fluidly actuated support, and optionally wherein the heating assembly forms a portion of a/the flange plate of the fluidly actuated support.

A20. The system of any of paragraphs A1-A19.2, wherein the system includes a wrinkle diffuser that is configured to reduce wrinkling of the layered charge during deformation of the layered charge.

A20.1 The system of paragraph A20, wherein the wrinkle diffuser includes an undulating surface that is configured to induce surface undulations within the layered charge.

A20.2 The system of any of paragraphs A20-A20.1, wherein the wrinkle diffuser is in contact with a portion of the layered charge that deforms when the layered charge transitions from the initial conformation to the final conformation.

A20.3 The system of any of paragraphs A20-A20.2, wherein the wrinkle diffuser is located between the layered charge and the vacuum bag.

A20.4 The system of any of paragraphs A20-A20.3, wherein the wrinkle diffuser is located between the fluidly actuated support and the layered charge.

A21. The system of any of paragraphs A1-A20.4, wherein the layered charge is located within the enclosed volume and is in contact with the forming die and the fluidly actuated support.

A21.1 The system of paragraph A21, wherein the fluidly actuated support is in an intermediate conformation that is between an/the extended conformation and a/the retracted conformation, wherein the layered charge defines a first bend that is proximal to an edge of the forming die and a second bend that is proximal to an interface region between the forming die and the fluidly actuated support.

A21.1.1 The system of paragraph A21.1, wherein a radius of curvature of the second bend is at least one of:

(i) at least 1 centimeters (cm), at least 2 cm, at least 3 cm, at least 4 cm, at least 6 cm, at least 8 cm, or at least 10 cm; and (ii) less than 30 cm, less than 28 cm, less than 26 cm, less than 24 cm, less than 22 cm, less than 20 cm, less than 18 cm, less than 16 cm, less than 14 cm, less than 12 cm, less than 10 cm, less than 8 cm, less than 6 cm, less than 5 cm, less than 4 cm, or less than 3 cm.

A22. The system of any of paragraphs A1-A21.1.1, wherein the desired surface contour is a non-planar surface contour, and optionally wherein the desired surface contour is a complex surface contour that varies in at least two dimensions.

B1. A method of defining a desired surface contour of a layered charge of material, the method comprising:

locating the layered charge on a forming surface of a forming die and on a support surface of a fluidly actuated support that is adjacent to the forming die;

covering the layered charge with a vacuum bag to define an enclosed volume that contains the forming surface, the support surface, and the layered charge;

applying a vacuum to the enclosed volume;

compressing the fluidly actuated support;

concurrently with the compressing, translating the support surface relative to the forming surface; and concurrently with the translating, deforming the layered charge to define the desired surface contour, wherein the deforming includes retaining the layered charge in contact with the forming surface and with the support surface during at least a portion of the translating.

B2. The method of paragraph B1, wherein the locating includes establishing physical contact between the layered charge and the forming surface and between the layered charge and the support surface.

B3. The method of any of paragraphs B1-B2, wherein the covering includes fluidly isolating the enclosed volume from an ambient environment that surrounds the enclosed volume.

B4. The method of any of paragraphs B1-B3, wherein the covering includes restricting fluid communication between the enclosed volume and an/the ambient environment that surrounds the enclosed volume.

B5. The method of any of paragraphs B1-B4, wherein the applying includes evacuating the enclosed volume.

B6. The method of any of paragraphs B1-B5, wherein the applying includes vacuum compacting the layered charge.

B7. The method of any of paragraphs B1-B6, wherein the applying is performed for an initial application time prior to initiation of the compressing.

B8. The method of any of paragraphs B1-B6, wherein the applying and the compressing are initiated simultaneously.

B9. The method of any of paragraphs B1-B6, wherein the applying and the compressing are at least partially, and optionally completely, concurrent.

B10. The method of any of paragraphs B1-B6, wherein the compressing is responsive to the applying.

B11. The method of any of paragraphs B1-B6, wherein the compressing is initiated independently from the applying.

B12. The method of any of paragraphs B1-B11, wherein the compressing includes transitioning the fluidly actuated support from an extended conformation to a retracted conformation.

B13. The method of any of paragraphs B1-B12, wherein the fluidly actuated support includes a covering that defines a covered volume, wherein the vacuum is a first vacuum, and further wherein the compressing includes applying a second vacuum to the covered volume.

B13.1 The method of paragraph B13, wherein the applying the second vacuum is independent from the applying the first vacuum.

813.2 The method of any of paragraphs B1-B13.1, wherein the method further includes regulating a rate of compression of the fluidly actuated support by regulating a rate of application of a vacuum, optionally wherein the vacuum includes at least one, and optionally both, of a/the first vacuum and a/the second vacuum.

B13.2.1 The method of paragraph B13.2, wherein the regulating the rate of compression includes regulating the rate of compression to regulate a rate of deformation of the layered charge.

B13.2.2 The method of any of paragraphs B13.2-B13.2.1, wherein the regulating the rate of compression includes regulating the rate of compression to regulate a radius of curvature that is experienced by the layered charge during the deforming.

B13.2.2.1 The method of paragraph B13.2.2, wherein the regulating the rate of compression includes increasing the rate of application of the vacuum to increase the radius of curvature.

B13.2.2.2 The method of any of paragraphs B13.2.2-B13.2.2.1, wherein the regulating the rate of compression includes decreasing the rate of application of the vacuum to decrease the radius of curvature.

B14. The method of any of paragraphs B1-B13.2.2.2, wherein the translating includes translating the support surface in a vertical direction relative to the forming surface.

B15. The method of any of paragraphs B1-B14, wherein the translating includes resisting motion of the support surface relative to the forming surface in a lateral direction.

B16. The method of any of paragraphs B1-B15, wherein the translating includes increasing a fraction of the layered charge that is supported by the forming surface.

B17. The method of any of paragraphs B1-B16, wherein the translating includes decreasing a fraction of the layered charge that is supported by the support surface.

B18. The method of any of paragraphs B1-B17, wherein the translating includes sliding the layered charge across the support surface to transfer the layered charge from the support surface to the forming surface.

B19. The method of any of paragraphs B1-B18, wherein the deforming includes establishing a first bend that is proximal to an edge of the forming die and a second bend that is proximal to an interface between the forming die and the fluidly actuated support.

B19.1 The method of paragraph B19, wherein the deforming includes deforming such that a radius of curvature of the second bend is at least one of:

(i) at least 1 cm, at least 2 cm, at least 3 cm, at least 4 cm, at least 6 cm, at least 8 cm, or at least 10 cm; and (ii) less than 30 cm, less than 28 cm, less than 26 cm, less than 24 cm, less than 22 cm, less than 20 cm, less than 18 cm, less than 16 cm, less than 14 cm, less than 12 cm, less than 10 cm, less than 8 cm, less than 6 cm, less than 5 cm, less than 4 cm, or less than 3 cm.

B20. The method of any of paragraphs B1-B19.1, wherein the deforming includes maintaining the support surface at least substantially parallel to the forming surface.

B21. The method of any of paragraphs B1-B20, wherein the deforming includes tilting the support surface relative to the forming surface during the deforming.

B22. The method of any of paragraphs B1-B21, wherein the method further includes locating a sacrificial slip film between the fluidly actuated support and the layered charge, optionally wherein the method further includes at least one of (i) reducing friction between the fluidly actuated support and the layered charge with the sacrificial slip film and (ii) restricting physical contact between the fluidly actuated support and the layered charge with the sacrificial slip film.

B23. The method of any of paragraphs B1-B22, wherein the system further includes a rigid standoff, wherein the fluidly actuated support extends between the forming die and the rigid standoff, and further wherein the method includes maintaining the rigid standoff (at least substantially) immobile during the applying, the compressing, the translating, and the deforming.

B24. The method of any of paragraphs B1-B23, wherein the method further includes locating a stretch film between the vacuum bag and the layered charge, optionally wherein the method further includes at least one of (i) reducing friction between the vacuum bag and the layered charge with the stretch film; (ii) restricting direct physical contact between the vacuum bag and the layered charge with the stretch film; and (iii) maintaining, during the deforming, at least a portion of the layered charge in tension with the stretch film.

B25. The method of any of paragraphs B1-B24, wherein the method further includes heating the layered charge, optionally wherein the heating includes at least one of (i) heating prior to the applying, (ii) heating prior to the compressing, (iii) heating prior to the translating, (iv) heating prior to the deforming, (v) heating concurrently with the applying, (vi) heating concurrently with the compressing, (vii) heating concurrently with the translating, and (viii) heating concurrently with the deforming.

B25.1 The method of paragraph B25, wherein the heating includes at least one of (i) heating at least a portion of the fluidly actuated support to heat the layered charge, (ii) heating at least a portion of the forming die to heat the layered charge, and (iii) directing a heat lamp onto the layered charge.

B26. The method of any of paragraphs B1-B25.1, wherein the method further includes locating a wrinkle diffuser in contact with the layered charge.

B26.1 The method of paragraph B26, wherein the locating the wrinkle diffuser includes at least one of (i) locating the wrinkle diffuser between the layered charge and the vacuum bag and (ii) locating the wrinkle diffuser between the fluidly actuated support and the layered charge.

B26.2 The method of any of paragraphs B26-B26.1, wherein the method further includes inducing, with the wrinkle diffuser, surface undulations within the layered charge.

B26.3 The method of any of paragraphs B26-B26.2, wherein the method further includes resisting, with the wrinkle diffuser, wrinkling of the layered charge during the deforming.

B27. The method of any of paragraphs B1-B26.3, wherein the layered charge includes a plurality of plies of the material.

B27.1 The method of paragraph B27, wherein the plurality of plies includes at least one of:

(i) at least 2, at least 5, at least 10, at least 20, at least 30, at least 40, or at least 50 plies; and (ii) fewer than 200, fewer than 175, fewer than 150, fewer than 125, fewer than 100, fewer than 80, fewer than 60, or fewer than 50 plies.

B28. The method of any of paragraphs B1-B27.1, wherein the material includes a pre-impregnated composite material.

B29. The method of any of paragraphs B1-B28, wherein the material includes at least one of a resin-free dry preform, a fiberglass, a fiberglass cloth, carbon fibers, a carbon cloth, and a cloth.

B30. The method of any of paragraphs B1-B29, wherein the layered charge defines a thickness of at least one of:

(i) at least 1 mm, at least 2 mm, at least 3 mm, at least 4 mm, at least 5 mm, at least 6 mm, at least 8 mm, at least 10 mm, at least 12 mm, at least 14 mm, at least 16 mm, at least 18 mm, or at least 20 mm; and (ii) less than 40 mm, less than 35 mm, less than 30 mm, less than 25 mm, less than 20 mm, or less than 15 mm.

B31. The method of any of paragraphs B1-B30, wherein the method further includes repeating the method.

B32. The method of any of paragraphs B1-B31, wherein the layered charge is a first layered charge, wherein, subsequent to the deforming, the method includes removing the first layered charge from the forming surface of the forming die and repeating the locating, the covering, the applying, the compressing, the translating, and the deforming to define the desired surface contour in the second layered charge.

B33. The system of any of paragraphs B1-B32, wherein the desired surface contour is a non-planar surface contour, and optionally wherein the desired surface contour is a complex surface contour that varies in at least two dimensions.

B34. The method of any of paragraphs B1-B33, wherein the method includes performing the method with the forming system of any of paragraphs A1-A22.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus. As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A forming system for deforming a layered charge of material from an initial conformation to a final conformation to define a desired surface contour of the layered charge, the system comprising:
    a forming die having a forming surface that is shaped to at least partially define the desired surface contour of the layered charge;
    a fluidly actuated support having a support surface that is adjacent to the forming surface and located to at least temporarily support a portion of the layered charge, wherein the fluidly actuated support is configured to be compressed to transition from an extended conformation to a retracted conformation;
    a vacuum bag that at least partially defines an enclosed volume that contains the forming surface, the fluidly actuated support, and the support surface; and
    a vacuum source that is configured to selectively apply a vacuum to the enclosed volume.

2. The system of claim 1, wherein the forming surface includes an initial contact region and a subsequent contact region, wherein the initial contact region is configured to contact the layered charge when the layered charge is in the initial conformation, and further wherein both the initial contact region and the subsequent contact region are configured to contact the layered charge when the layered charge is in the final conformation.

3. The system of claim 2, wherein the support surface is adjacent to the initial contact region when the layered charge is in the initial conformation.

4. The system of claim 1, wherein the fluidly actuated support is configured to transition among a plurality of conformations between the extended conformation and the retracted conformation.

5. The system of claim 4, wherein, when the fluidly actuated support is in the extended conformation, the layered charge is supported by the support surface and by an initial contact region of the forming surface, and further wherein, when the fluidly actuated support is in the retracted conformation, the layered charge is supported by the initial contact region of the forming surface and by a subsequent contact region of the forming surface but not by the support surface.

6. The system of claim 4, wherein the fluidly actuated support is configured to transition between the extended conformation and the retracted conformation responsive to a pressure within the enclosed volume.

7. The system of claim 1, wherein the fluidly actuated support includes a foam body.

8. The system of claim 7, wherein the fluidly actuated support includes a covering that defines a covered volume that includes the foam body, wherein the covering fluidly isolates the foam body from the enclosed volume, wherein the system further includes a vacuum manifold that is in fluid communication with the covered volume, wherein the vacuum source is a first vacuum source, wherein the vacuum is a first vacuum, and further wherein the system includes a second vacuum source that is configured to selectively apply a second vacuum to the covered volume.

9. The system of claim 8, wherein the second vacuum source is configured to selectively apply the second vacuum independent from application of the first vacuum by the first vacuum source.

10. The system of claim 1, wherein the fluidly actuated support further includes a flange plate, wherein the flange plate defines the support surface of the fluidly actuated support.

11. The system of claim 10, wherein the flange plate is a rigid flange plate.

12. The system of claim 10, wherein a stiffness of the flange plate is greater than a stiffness of a remainder of the fluidly actuated support.

13. The system of claim 10, wherein the flange plate further includes a heating assembly that is configured to heat the layered charge.

14. The system of claim 1, wherein the system further includes a heating assembly that is configured to heat the layered charge.

15. The system of claim 1, wherein the layered charge is located within the enclosed volume and in contact with the forming die and with the fluidly actuated support, wherein the fluidly actuated support is in an intermediate conformation that is between the extended conformation and the retracted conformation, and further wherein the layered charge defines a first bend that is proximal to an edge of the forming die and a second bend that is proximal to an interface region between the forming die and the fluidly actuated support.

16. The system of claim 1, wherein the system further includes a rigid standoff, wherein the enclosed volume includes the rigid standoff, and further wherein the fluidly actuated support extends between the forming die and the rigid standoff.

17. A method of defining a desired surface contour of a layered charge of material utilizing the forming system of claim 1, the method comprising:
    locating the layered charge on the forming surface of the forming die and on the support surface of the fluidly actuated support that is adjacent to the forming die;
    covering the layered charge with the vacuum bag to define the enclosed volume that contains the forming surface, the support surface, the fluidly actuated support, and the layered charge;
    applying the vacuum to the enclosed volume;
    compressing the fluidly actuated support;

concurrently with the compressing, translating the support surface relative to the forming surface; and concurrently with the translating, deforming the layered charge to define the desired surface contour, wherein the deforming includes retaining the layered charge in contact with the forming surface and with the support surface during at least a portion of the translating.

18. The method of claim 17, wherein the compressing is initiated independently from the applying.

19. The method of claim 17, wherein the compressing is responsive to the applying.

20. The method of claim 17, wherein the fluidly actuated support includes a covering that defines a covered volume, wherein the vacuum is a first vacuum, and further wherein the compressing includes applying a second vacuum to the covered volume.

21. The method of claim 20, wherein the applying the second vacuum is independent from the applying the first vacuum.

22. The method of claim 17, wherein the method further includes regulating a rate of compression of the fluidly actuated support by regulating a rate of application of a vacuum to regulate a radius of curvature that is experienced by the layered charge during the deforming, wherein the regulating the rate of compression includes at least one of (i) increasing the rate of application of the vacuum to increase the radius of curvature and (ii) decreasing the rate of application of the vacuum to decrease the radius of curvature.

23. The method of claim 17, wherein the method further includes regulating compression of the fluidly actuated support by regulating a pressure within the enclosed volume to regulate a radius of curvature that is experienced by the layered charge during the deforming, wherein the regulating compression includes at least one of (i) increasing the pressure to decrease compression of the fluidly actuated support and (ii) decreasing the pressure to increase compression of the fluidly actuated support.

24. The method of claim 17, wherein the translating includes sliding the layered charge across the support surface to transfer the layered charge from the support surface to the forming surface.

25. The method of claim 24, wherein the method further includes selecting a frictional force between the support surface and the layered charge such that the frictional force maintains a desired amount of tension in the layered charge during the sliding.

26. The method of claim 25, wherein the selecting includes at least one of (i) selecting a surface roughness of the support surface, (ii) selecting a surface energy of the support surface, (iii) selecting a surface texture of the support surface, (iv) selecting a surface roughness of a sacrificial slip film that extends between the support surface and the layered charge, (v) selecting a surface energy of the sacrificial slip film, (vi) selecting an adhesive force between the layered charge and the sacrificial slip film, (vii) selecting an adhesive force between the support surface and the sacrificial slip film, and (viii) selecting a surface texture of the sacrificial slip film.

27. The method of claim 17, wherein the deforming includes establishing a first bend in the layered charge that is proximal to an edge of the forming die and a second bend in the layered charge that is proximal to an interface between the forming die and the fluidly actuated support.

28. The method of claim 17, wherein the method further includes locating a wrinkle diffuser in contact with the layered charge and inducing surface undulations within the layered charge with the wrinkle diffuser during the deforming.

* * * * *